United States Patent
Ling et al.

(10) Patent No.: US 11,853,397 B1
(45) Date of Patent: Dec. 26, 2023

(54) METHODS FOR DETERMINING ENTITY STATUS, AND RELATED SYSTEMS AND APPARATUS

(71) Applicant: Entelo, Inc., San Francisco, CA (US)

(72) Inventors: Chin Keong Ling, Walnut Creek, CA (US); Cole Walter Goeppinger, San Francisco, CA (US); Haroon Rasheed Paul Mohamed, Sunnyvale, CA (US)

(73) Assignee: Entelo, Inc., San Francisco, CA (US)

( * ) Notice: Subject to any disclaimer, the term of this patent is extended or adjusted under 35 U.S.C. 154(b) by 1368 days.

(21) Appl. No.: 16/149,693

(22) Filed: Oct. 2, 2018

Related U.S. Application Data

(63) Continuation of application No. 29/644,134, filed on Apr. 15, 2018, now abandoned, and a
(Continued)

(51) Int. Cl.
*G06F 18/2413* (2023.01)
*G06F 16/9035* (2019.01)
(Continued)

(52) U.S. Cl.
CPC ...... *G06F 18/2413* (2023.01); *G06F 16/9024* (2019.01); *G06F 16/9035* (2019.01);
(Continued)

(58) Field of Classification Search
CPC .... G06K 9/627; G06K 9/6227; G06K 9/6257; G06F 16/9035; G06F 16/9024;
(Continued)

(56) References Cited

U.S. PATENT DOCUMENTS

| 6,691,122 B1 | 2/2004 | Witte et al. |
| 6,728,695 B1 | 4/2004 | Pathria et al. |

(Continued)

FOREIGN PATENT DOCUMENTS

| WO | WO-2013165923 A1 | 11/2013 |
| WO | WO-2017117201 A1 | 7/2017 |

OTHER PUBLICATIONS

Mehta, Sameep, et al., "Efficient Multifaceted Screening of Job Applicants", EDBT/ICDT '13, Genoa, Italy, Mar. 18-22, 2013, pp. 661-671.*

(Continued)

*Primary Examiner* — Robert Stevens
(74) *Attorney, Agent, or Firm* — McDermott Will & Emery LLP

(57) ABSTRACT

In some embodiments, status scores representing the status of an entity at various times are determined. Classifiers may be used to translate the status scores into status levels, and visual representations of the progression of the entity's status levels over time may be generated. In some embodiments, predictive models are used to detect outlying events and entities based on the status scores. Some predictive models may be used to predict whether an entity is an outlying candidate for a transition from one state to another state. Other predictive models may be used to predict whether an entity is an outlier relative to a group of other entities.

20 Claims, 10 Drawing Sheets

Related U.S. Application Data continuation-in-part of application No. 29/644,135, filed on Apr. 15, 2018, now abandoned.

(60) Provisional application No. 62/567,167, filed on Oct. 2, 2017.

(51) Int. Cl.
  *G06Q 10/1053* (2023.01)
  *G06F 16/901* (2019.01)
  *G06F 17/18* (2006.01)
  *G06F 18/20* (2023.01)
  *G06F 18/214* (2023.01)

(52) U.S. Cl.
  CPC .......... *G06F 17/18* (2013.01); *G06F 18/2148* (2023.01); *G06F 18/285* (2023.01); *G06Q 10/1053* (2013.01)

(58) Field of Classification Search
  CPC .... G06F 17/18; G06F 18/2413; G06F 18/285; G06F 18/2148; G06Q 10/1053
  USPC ......................................................... 706/45
  See application file for complete search history.

(56) References Cited

U.S. PATENT DOCUMENTS

| | | | |
|---|---|---|---|
| 7,457,764 B1 * | 11/2008 | Bullock | G06Q 10/063118 705/7.14 |
| 8,285,719 B1 | 10/2012 | Long et al. | |
| 8,719,179 B2 | 5/2014 | Bonmassar et al. | |
| 9,342,592 B2 | 5/2016 | Giverts et al. | |
| 9,665,641 B1 | 5/2017 | Zhang | |
| 9,734,207 B2 | 8/2017 | Goeppinger et al. | |
| 11,030,554 B2 * | 6/2021 | Polli | G09B 7/02 |
| 2002/0073079 A1 | 6/2002 | Terheggen | |
| 2002/0143573 A1 | 10/2002 | Bryce et al. | |
| 2004/0034652 A1 | 2/2004 | Hofmann et al. | |
| 2005/0187802 A1 * | 8/2005 | Koeppel | G06Q 40/08 705/4 |
| 2006/0070012 A1 | 3/2006 | Milener et al. | |
| 2006/0116894 A1 | 6/2006 | DiMarco | |
| 2007/0027859 A1 | 2/2007 | Harney et al. | |
| 2007/0198480 A1 | 8/2007 | Hogue et al. | |
| 2009/0164641 A1 | 6/2009 | Rogers et al. | |
| 2009/0182733 A1 | 7/2009 | Itoh | |
| 2009/0248685 A1 | 10/2009 | Pasqualoni et al. | |
| 2009/0327013 A1 | 12/2009 | McGovern et al. | |
| 2010/0114663 A1 * | 5/2010 | Casas | G06Q 30/0202 705/7.31 |
| 2010/0174713 A1 | 7/2010 | Baessler et al. | |
| 2010/0241635 A1 | 9/2010 | Derosear et al. | |
| 2010/0287111 A1 | 11/2010 | Scarborough et al. | |
| 2011/0022530 A1 | 1/2011 | Bogle et al. | |
| 2011/0040764 A1 | 2/2011 | Duchon et al. | |
| 2011/0125770 A1 | 5/2011 | Battestini et al. | |
| 2011/0137816 A1 | 6/2011 | Kornblum et al. | |
| 2011/0196802 A1 | 8/2011 | Ellis et al. | |
| 2011/0225048 A1 | 9/2011 | Nair | |
| 2011/0238591 A1 | 9/2011 | Kerr et al. | |
| 2011/0307303 A1 * | 12/2011 | Dutta | G06Q 10/00 707/E17.014 |
| 2012/0072500 A1 | 3/2012 | Greene et al. | |
| 2012/0095931 A1 | 4/2012 | Gurion et al. | |
| 2012/0158414 A1 * | 6/2012 | Watford | G06Q 10/105 705/1.1 |
| 2012/0158792 A1 | 6/2012 | MacLaurin et al. | |
| 2012/0180135 A1 | 7/2012 | Hodges et al. | |
| 2012/0197835 A1 | 8/2012 | Costa et al. | |
| 2012/0226749 A1 | 9/2012 | Dale et al. | |
| 2012/0246137 A1 | 9/2012 | Sallakonda et al. | |
| 2012/0290659 A1 | 11/2012 | Rao et al. | |
| 2012/0323704 A1 | 12/2012 | Steelberg et al. | |
| 2012/0330856 A1 | 12/2012 | Hyder et al. | |
| 2013/0013526 A1 | 1/2013 | Le Viet et al. | |
| 2013/0036065 A1 | 2/2013 | Chen et al. | |
| 2013/0054598 A1 | 2/2013 | Caceres | |
| 2013/0097093 A1 | 4/2013 | Kolber et al. | |
| 2013/0166573 A1 | 6/2013 | Vaitheeswaran et al. | |
| 2013/0290206 A1 | 10/2013 | Desai et al. | |
| 2013/0290207 A1 | 10/2013 | Bonmassar | |
| 2013/0290208 A1 | 10/2013 | Bonmassar et al. | |
| 2013/0325734 A1 | 12/2013 | Bixler et al. | |
| 2014/0032435 A1 | 1/2014 | Desai | |
| 2014/0122355 A1 | 5/2014 | Hardtke et al. | |
| 2014/0143164 A1 | 5/2014 | Posse et al. | |
| 2014/0156675 A1 | 6/2014 | Burstein et al. | |
| 2014/0164290 A1 * | 6/2014 | Salter | G06Q 40/06 705/36 R |
| 2014/0207699 A1 | 7/2014 | Bonmassar et al. | |
| 2014/0236530 A1 | 8/2014 | Greene et al. | |
| 2014/0344174 A1 | 11/2014 | Ruan et al. | |
| 2015/0025928 A1 | 1/2015 | Kang et al. | |
| 2015/0293997 A1 | 10/2015 | Smith et al. | |
| 2015/0310393 A1 | 10/2015 | Bhaskaran et al. | |
| 2015/0339785 A1 | 11/2015 | Bischke et al. | |
| 2016/0110424 A1 | 4/2016 | Goeppinger et al. | |
| 2016/0132830 A1 | 5/2016 | Zhang et al. | |
| 2016/0132909 A1 | 5/2016 | Guidi et al. | |
| 2016/0132953 A1 | 5/2016 | Davar et al. | |
| 2016/0292645 A1 * | 10/2016 | Polli | G09B 7/02 |
| 2016/0371625 A1 * | 12/2016 | Mosley | G06Q 10/06393 |
| 2017/0032326 A1 | 2/2017 | Zhao | |
| 2017/0061016 A1 | 3/2017 | Lytkin et al. | |
| 2017/0061382 A1 | 3/2017 | Zhang et al. | |
| 2017/0154268 A1 | 6/2017 | Goldin | |
| 2017/0154307 A1 | 6/2017 | Maurya et al. | |
| 2017/0154308 A1 | 6/2017 | Duerr et al. | |
| 2017/0236095 A1 | 8/2017 | Schreiber et al. | |
| 2018/0004822 A1 | 1/2018 | Mulder et al. | |
| 2018/0039701 A1 | 2/2018 | Pemble et al. | |
| 2018/0039945 A1 | 2/2018 | Posse et al. | |
| 2018/0039946 A1 * | 2/2018 | Bolte | G06Q 50/2057 |
| 2018/0096306 A1 | 4/2018 | Wang et al. | |
| 2018/0121879 A1 | 5/2018 | Zhang et al. | |
| 2018/0121880 A1 | 5/2018 | Zhang et al. | |
| 2018/0173804 A1 | 6/2018 | Kenthapadi et al. | |
| 2018/0232751 A1 | 8/2018 | Terhark et al. | |
| 2019/0019159 A1 | 1/2019 | Champaneria | |
| 2019/0026681 A1 * | 1/2019 | Polli | G06Q 10/06398 |
| 2019/0034883 A1 | 1/2019 | Liang et al. | |
| 2019/0042646 A1 | 2/2019 | Hoang et al. | |
| 2019/0102720 A1 | 4/2019 | Jennings et al. | |
| 2019/0295004 A1 | 9/2019 | Chaturapruek et al. | |

OTHER PUBLICATIONS

"Quantile", Wikipedia, Aug. 2022, 9 pages.*
"Quartile", Wikipedia, Aug. 2022, 7 pages.*
U.S. Appl. No. 13/910,018, filed Jun. 4, 2013, Bischke et al.
U.S. Appl. No. 13/910,054, filed Jun. 4, 2013, Bischke et al.
U.S. Appl. No. 14/814,210, filed Nov. 26, 2015, Bischke et al.
"Analyze My Writing," http://www.analyzemywriting.com/about_us.html, (1 page), Jan. 5, 2022.
"Augmented Writing is a Learning Loop for Words," https://textio.ai/augmented-writing-is-a-learning-loop-for-words-5b0a6b2c0929, (7 pages), Jan. 5, 2022.
"EasyEmail | Email Replies Drafted for You in Seconds," https://www.easyemail.ai/, (3 pages), Jan. 5, 2022.
"FAQ Grammarly," https://www.grammarly.com/faq#toc1, (2 pages), Jan. 5, 2022.
"For the Smarter Writer," https://prowritingaid.com/, (10 pages), Jan. 5, 2022.
"Free Online Proofreading," https://typely.com, (3 pages), Jan. 5, 2022.
"Hemingway Help," http://www.hemingwayapp.com/help.html, (4 pages), Jan. 5, 2022.
"Thoughtful Productivity Software that Helps You Focus on What Matters," https://boomerangapp.com/about.html, (3 pages), Jan. 5, 2022.

(56) References Cited

OTHER PUBLICATIONS

Bullhorn Reach. "Recruit the Best Talent," http://www.bullhornreach.com. Copyright 2013. Accessed on Jun. 23, 2015. 2 pg.

Bullhorn reach. How it works. Http://www.bullhornreach.com/reach/content/how-it-works. Copyright 2013. Accessed on Jun. 23, 2015. 2 pg.

Christen, Peter et al., "Efficient Entity Resolution with Adaptive and Interactive Training Data Selection", 2013 IEEE 13th International Conference on Data Mining, IEEE, Nov. 14, 2015 (6 pages).

GitHub. Gist is a simple way to share snippets and pastes with others. https://gist.github.com/. Copyright 2015. Accessed on Jun. 23, 2015. 1 pg.

H. Been. "Finding You on the Internet: Entity resolution on Twitter accounts and real world people," M.S. Thesis, University of Twente, Jun. 18, 2013. (101 pages).

International Search Report and Written Opinion for International Application No. PCT/US2016/068844 dated Apr. 4, 2017 (20 pages).

Lee, R., "Job Change Notifier," http://jobchangenotifier.com/. Copyright 2015. Accessed on Jun. 23, 2015. 1 pg.

LinkedIn. Rapportive. https://rapportive.com/. Copyright 2014. Accessed on Jun. 23, 2015. 2 pg.

Xobni. "Xobni has joined Yahoo!," http://address.yahoo.com/xobni. 2013. Accessed on Jun. 23, 2015. 5 pg.

Yi, X., et al., (2007) "Matching Resumes and Jobs Based on Relevance Models," Proc. of the 30th Annual International ACM SIGIR Conference on Research and Development in Information Retrieval (SIGIR 2007); pp. 809-810; Jul. 23-27, 2007.

U.S. Appl. No. 16/384,851, filed Apr. 15, 2019, Ling et al.

U.S. Appl. No. 16/384,789, filed Apr. 15, 2019, Mohamed et al.

U.S. Appl. No. 16/384,768, filed Apr. 15, 2019, Mohamed et al.

Final Office Action dated Jul. 14, 2016 for U.S. Appl. No. 13/910,054, by Jonathan P. Bischke et al., Abandoned, 23 pages.

Office Action dated Oct. 5, 2015 for U.S. Appl. No. 14/814,210, by Jonathan P. Bischke et al., Abandoned, 18 pages.

Office Action dated Oct. 2, 2015 for U.S. Appl. No. 13/910,054, by Jonathan P. Bischke et al., Abandoned, 17 pages.

U.S. Appl. No. 13/910,029, titled "Systems and methods for Notification of Profile Activity Suggestive of Career Change Across Multiple Websites", filed Jun. 4, 2013, Abandoned (unpublished), Specification, 22 pages.

\* cited by examiner

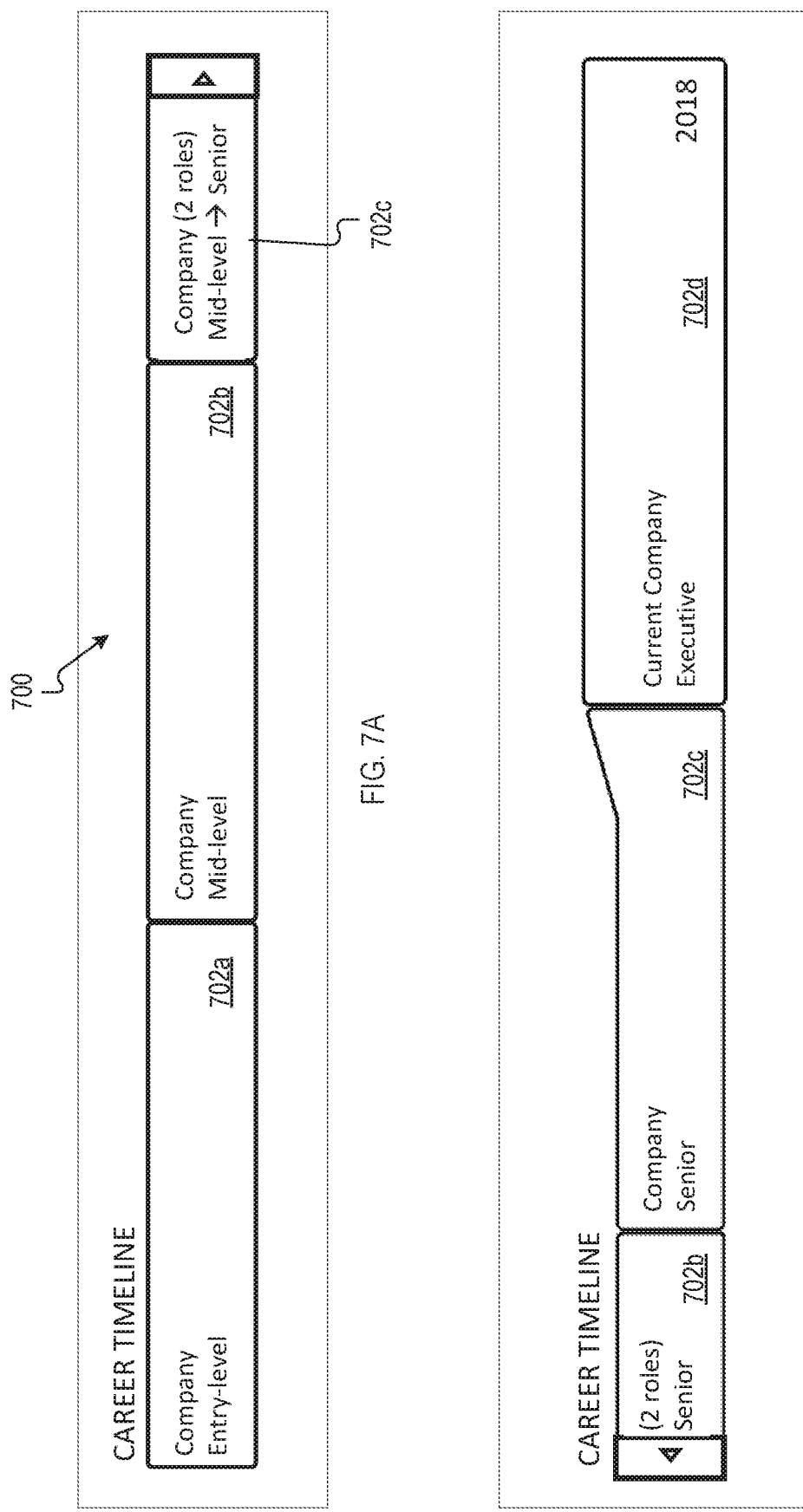

US 11,853,397 B1

METHODS FOR DETERMINING ENTITY STATUS, AND RELATED SYSTEMS AND APPARATUS

CROSS REFERENCE TO RELATED APPLICATIONS

This application is a continuation-in-part of and claims priority under 35 U.S.C. § 120 to U.S. Patent Design Application No. 29/644,134, titled "Display Screen or Portion Thereof with Animated Graphical User Interface" and filed on Apr. 15, 2018, is a continuation-in-part of and claims priority under 35 U.S.C. § 120 to U.S. Patent Design Application No. 29/644,135, titled "Display Screen or Portion Thereof with Animated Graphical User Interface" and filed on Apr. 15, 2018, and claims priority and benefit under 35 U.S.C. § 119(e) of U.S. Provisional Patent Application No. 62/567,167, titled "Methods for Detecting Outliers, and Related Systems and Apparatus" and filed on Oct. 2, 2017, the entire contents of each of which are hereby incorporated by reference herein.

FIELD OF INVENTION

The present disclosure relates generally to techniques for determining the status of entities and for detecting outlying entities. Some embodiments described herein relate specifically to detecting entities that are outlying candidates (e.g., under-qualified or over-qualified candidates) for transitioning to a specified state based, at least in part, on the entities' status.

BACKGROUND

State transition monitoring techniques can be used to monitor and model the states of entities (e.g., systems, organisms, etc.) in a wide variety of fields, including but not limited to malware detection and recruiting. For example, cybersecurity systems can monitor states of computer systems to determine whether the systems are infected with malware. As another example, recruiting or human resources professionals can monitor states of people to determine whether they are good candidates for admission (e.g., to a school), hiring, or promotion.

SUMMARY OF THE INVENTION

In many fields, it is useful to know whether a transition of an entity from its current state to a new state would be abnormal. For example, in recruiting applications, an abnormal transition might signify a scenario in which a candidate transitions to a position for which the candidate is not well-suited (e.g., the candidate is under-qualified or over-qualified for the position). Conventional techniques for detecting abnormal state transitions tend to be cumbersome, inefficient, and/or domain specific. Efficient and generally applicable techniques for detecting abnormal state transitions are needed.

In addition, it is often useful to know whether an entity is an outlier relative to a set of other entities. For example, in recruiting applications, such an outlying entity might represent a candidate for a position who is in outlier relative to other candidates for the position (e.g., the candidate may be under-qualified or over-qualified relative to the other candidates). Conventional techniques for detecting outlying entities tend to be cumbersome, inefficient, and/or domain specific. Efficient and generally applicable techniques for detecting outlying entities are needed.

The inventors have recognized and appreciated that statistical analysis techniques can be used to train a predictive model to identify outliers (e.g., state transitions that are statistical outliers, entities that are statistical outliers, etc.).

In general, one innovative aspect of the subject matter described in this specification can be embodied in a method for generating a predictive model capable of predicting an extent to which an entity is qualified for a state transition. The method may include: obtaining reference entity data indicating, for each entity included in a plurality of entities, at least a current state of the entity; determining, for each reference state included in a plurality of reference states, values of one or more representative attributes of the reference state, wherein the values of the representative attributes of the reference states are determined based on the reference entity data; and training a predictive model to predict the extent to which an entity is qualified for a state transition based on at least a portion of the reference entity data and the representative attribute values of the reference states.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, for one or more of the entities, the reference entity data further indicate one or more prior states of the entity and one or more prior state transitions of the entity. In some embodiments, for a particular entity included in the one or more entities, the portion of the reference entity data corresponding to a particular state of the particular entity includes a label for the particular state and values of one or more attributes of the particular state. In some embodiments, the attributes of the particular state include one or more environmental attributes associated with the particular state. In some embodiments, the attributes of the particular state include one or more temporal attributes associated with habitation of the particular state by the entity. In some embodiments, for a particular entity included in the one or more entities, the portion of the reference entity data corresponding to a particular prior state transition of the particular entity includes values of one or more attributes of the particular prior state transition.

In some embodiments, determining the values of the one or more representative attributes of a particular reference state includes: identifying portions of the reference entity data representing a plurality of instances of the particular reference state, wherein each identified portion of the reference entity data corresponds to a respective entity; and determining the values of the one or more representative attributes of the particular reference state based on the identified portions of the reference entity data. In some embodiments, identifying the portions of the reference entity data representing the instances of the particular reference state includes: identifying, in the portions of the reference entity data, a plurality of instances of a state label matching a reference label corresponding to the particular reference state. In some embodiments, the representative attributes of the particular reference state include a rank attribute, a preparation time attribute, a duration attribute, a centrality attribute, and/or a state score.

In some embodiments, determining the values of the representative attributes of the particular reference state includes: determining, for each instance of the particular reference state, a rank of the particular reference state in a temporal sequence of states inhabited by the corresponding entity; and determining an average and/or a median of the ranks of the particular reference state in the temporal sequences of states inhabited by the corresponding entities, wherein the value of the rank attribute is the average and/or the median of the ranks.

In some embodiments, determining the values of the representative attributes of the particular reference state includes: determining, for each instance of the particular reference state, an amount of preparation time during which the corresponding entity inhabited one or more prior states before entering the particular reference state; and determining an average and/or a median of the amounts of preparation time for the particular reference state, wherein the value of the preparation time attribute is the average and/or the median of the amounts of preparation time.

In some embodiments, determining the values of the representative attributes of the particular reference state includes: determining, for each instance of the particular reference state, a duration of time for which the corresponding entity inhabited the particular reference state; and determining an average and/or a median of the amounts of the durations of time during which the corresponding entities inhabited the particular reference state, wherein the value of the duration attribute is the average and/or the median of the amounts of the durations. In some embodiments, determining the values of the representative attributes of the particular reference state includes: obtaining a graph with nodes corresponding to the respective reference states and directed edges corresponding to transitions between the respective reference states, wherein the value of the centrality attribute is a centrality of the node corresponding to the particular reference state.

In some embodiments, the value of the state score is determined based on the value of the rank attribute, the value of the preparation time attribute, the value of the duration attribute, and/or the value of the centrality attribute. In some embodiments, the value of the state score is a product of (1) the value of the preparation time attribute, (2) a logarithm of the value of the rank attribute, and (3) a logarithm of the value of the duration attribute. In some embodiments, the value of the state score is a product of (1) the value of the preparation time attribute, (2) a logarithm of the value of the centrality attribute, and (3) a logarithm of the value of the duration attribute.

In some embodiments, the predictive model includes a plurality of sub-models corresponding to the respective reference states, wherein training the predictive model comprises training a particular sub-model corresponding to a particular reference state to predict the extent to which an entity is qualified for a state transition to the particular reference state. In some embodiments, training the particular sub-model includes: identifying portions of the reference entity data representing a plurality of instances of the particular reference state, wherein each identified portion of the reference entity data corresponds to a respective entity; determining, for each of the identified portions of the reference data, a status score of the corresponding entity, the status score representing a status of the entity when the entity inhabited the particular reference state; and segmenting the status scores into two or more ranges based on a distribution of the status scores, wherein each of the ranges corresponds to a respective extent of qualification for the state transition to the particular reference state. In some embodiments, the status score of a particular entity when the particular entity inhabited the particular reference state is determined based on a value of a rank characteristic, a value of a preparation time characteristic, a value of a duration characteristic, and/or a value of a centrality characteristic.

In some embodiments, determining the status score of the particular entity when the particular entity inhabited the particular reference state includes: determining, for the instance of the particular reference state in the portion of the reference entity data corresponding to the particular entity, a rank of the instance of the particular reference state in a temporal sequence of states inhabited by the particular entity, wherein the value of the rank characteristic is the determined rank of the instance of the particular reference state. In some embodiments, determining the status score of the particular entity when the particular entity inhabited the particular reference state includes: determining, for the instance of the particular reference state in the portion of the reference entity data corresponding to the particular entity, an amount of preparation time during which the particular entity inhabited one or more prior states before entering the particular reference state, wherein the value of the preparation time characteristic is the amount of preparation time during which the particular entity inhabited the prior states.

In some embodiments, determining the status score of the particular entity when the particular entity inhabited the particular reference state includes: determining, for the instance of the particular reference state in the portion of the reference entity data corresponding to the particular entity, a duration of time for which the particular entity inhabited the particular reference state, wherein the value of the duration characteristic is the duration of time for which the particular entity inhabited the particular reference state. In some embodiments, determining the status score of the particular entity when the particular entity inhabited the particular reference state includes: obtaining a graph with nodes corresponding to the respective reference states and directed edges corresponding to transitions between the respective reference states, wherein the value of the centrality characteristic is a centrality of the node corresponding to the particular reference state.

In some embodiments, the status score of the particular entity when the particular entity inhabited the particular reference state is a product of (1) the value of the preparation time characteristic, (2) a logarithm of the value of the rank characteristic, and (3) a logarithm of the value of the duration characteristic. In some embodiments, the status score of the particular entity when the particular entity inhabited the particular reference state is a product of (1) the value of the preparation time characteristic, (2) a logarithm of the value of the centrality characteristic, and (3) a logarithm of the value of the duration characteristic.

In some embodiments, segmenting the status scores into two or more ranges based on a distribution of the status scores includes: determining a lower quantile value, an upper quantile value, an inter-quantile range, a minimum threshold value, and a maximum threshold value based on the distribution of the status scores. In some embodiments, the lower quantile value is greater than approximately M/N of the status scores in the distribution and less than all other status scores in the distribution, M being a number of status scores in the distribution and N being a number of quantiles. In some embodiments, the upper quantile value is less than approximately M/N of the status scores in the distribution and greater than all other status scores in the distribution, M being a number of status scores in the distribution and N being a number of quantiles. In some embodiments, the inter-quantile range is a range of values between the upper quantile value and the lower quantile value. In some embodiments, the minimum threshold value is less than the lower quantile value, and the maximum threshold value is greater than the upper quantile value. In some embodiments, training the particular sub-model corresponding to the particular reference state to predict the extent to which an entity is qualified for a transition to the particular reference state includes: training the particular sub-model to classify any entity having a status score greater than the maximum threshold value as overqualified for the transition to the particular reference state; training the particular sub-model to classify any entity having a status score less than the minimum threshold value as underqualified for the transition to the particular reference state; and training the particular sub-model to classify any entity having a status score within the inter-quantile range as properly qualified for the transition to the particular reference state.

In some embodiments, training the predictive model includes: determining, for a pair of the reference states including a first reference state and a second reference state, values of one or more representative attributes of a plurality of transitions from the first reference state to the second reference state; and establishing criteria for determining the extent to which an entity is qualified for a transition from the first reference state to the second reference state based on the values of the representative attributes of the transitions from the first reference state to the second reference state. In some embodiments, the representative attributes of the transitions from first reference state to the second reference state include (1) representative first-order attributes of one or more direct transitions from the first reference state to the second reference state, (2) representative first-order attributes of one or more indirect transitions from the first reference state to the second reference state, and/or (3) representative second-order attributes of one or more transitions from the first reference state to the second reference state.

In some embodiments, the predictive model is a neural network, wherein training the predictive model comprises training the neural network to predict the extent to which an entity is qualified for a state transition to a particular state based on: (1) a status score for the entity, (2) a state score of the particular state, (3) a difference between the state score and the status score, (4) a duration for which the entity has inhabited a current state of the entity, (5) a sum of a preparation time of the entity for the current state and a duration for which the entity has inhabited the current state, (6) one or more values of environmental attributes of the current state, and/or (7) a feature vector derived from a description of the current state.

In general, another innovative aspect of the subject matter described in this specification can be embodied in a prediction method including: obtaining profile data for a candidate entity; identifying, based on the profile data, a first state associated with the candidate entity; selecting a predictive model trained to predict an extent to which an entity is qualified for a state transition from the first state to a second state, wherein the predictive model is trained by: obtaining reference entity data indicating the first state and optionally the second state for each entity included in a first plurality of entities, and indicating the second state and optionally the first state for each entity included in a second plurality of entities; determining values of one or more representative attributes of the first and second states based on the reference entity data, and providing at least a portion of the reference entity data and the representative attribute values of the first and second states to a training module for the predictive model; determining, based on the profile data, a status score of the candidate entity, the status score representing a status of the candidate entity when the entity inhabited the first state; and using the predictive model to predict an extent to which the candidate entity is qualified for the state transition from the first state to the second based, at least in part, on the status score of the candidate entity.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

In general, another innovative aspect of the subject matter described in this specification can be embodied in a classification method including: obtaining entity profile data indicating, for each entity included in a plurality of entities, one or more states of the entity; for each of the entities, determining a status score based at least in part on the entity profile data for the entity, wherein the status score represents a status of the entity; segmenting the status scores of the entities into two or more ranges based on a distribution of the status scores; and classifying a first entity included in the plurality of entities as an inlier or an outlier relative to the plurality of entities based on which of the ranges includes the status score of the first entity.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

Particular embodiments of the subject matter described in this specification can be implemented so as to realize one or more of the following advantages. In recruiting applications, these techniques can be used to identify over- or under-qualified candidates for a position (e.g., a job). In some embodiments, these techniques can be used to predict the extent to which an entity is qualified for a proposed state transition. In some embodiments, these techniques can be used to predict the extent to which an entity is over- or under-qualified relative to other entities in a group of entities.

The outlier detection techniques described herein can be used to improve the efficiency of artificially intelligent (AI) computer systems that (1) send communications to entities based on their suitabilities for transitioning to various states, and/or (2) track and store data relating to entities based on their suitabilities for transitioning to various states. For example, AI recruiting systems can use the outlier detection technique described herein to distinguish outlier candidates from inlier candidates in a pool of candidates for a position, and can send communications to the inlier candidates and/or track the inlier candidates while conserving network or memory resources that might otherwise be used to communicate with or track the outlier candidates. Thus, accurate detection of outliers by the AI systems can reduce the number of messages sent to poor candidates (i.e., outliers), thereby reducing the network bandwidth used by the AI systems. For example, network bandwidth used by AI systems for communication with candidates can be reduced and/or repurposed for other tasks. Moreover, accurate detection of outliers by the AI systems can also reduce the memory resources used by the AI systems. For example, memory resources used by the AI systems in tracking candidates and their respective attributes can be reduced and/or repurposed for other data.

When using the outlier detection techniques described herein, it is sometimes useful to determine the status of one or more entities. In some cases, the status of an entity may depend on the entity's current state, one or more of the entity's prior states, a sequence of states inhabited by the entity, a sequence of state transitions experienced by the entity, and/or any other suitable data. As used herein, the "status" of an entity may refer to the entity's standing, rank, position, seniority, etc. among a specified set of entities. However, the challenge of determining an entity's status can be distinct from the challenge of identifying outlying entities or outlying state transitions, and data indicating an entity's status may be used for many purposes other than identifying outliers.

Determining an entity's status can be particularly challenging because the meaning of "status" can be defined and interpreted in many ways. For example, "status" may refer to "seniority," which may encompass the concept of a person or group of people taking precedence over another person or group because the former is either older than the latter or has occupied a particular state (e.g., position) longer than the latter. Focusing on, for example, seniority as it relates to professional seniority (e.g., in the workplace), seniority can be additionally or alternatively measured by the entity's (i) job title and/or role; (ii) years of work experience; and/or (iii) years of relevant experience. Assessing the last factor is further complicated by the difficulty of determining the relevancy of an entity's experience, which may be based on, e.g., the entity's (a) recent job title and/or role; (b) recent skills and/or cluster or related skills; and/or (c) company and/or industry attributes (e.g., company type, company size, sector, sub-industry, industry, industry family, etc.). Two or more of factors (i)-(iii) and/or (a)-(c) can be related to each other or interact in different ways as compared to other sets of factors. For example, a job title (e.g., "Vice President") in a first industry (e.g., a non-financial industry) may be considered to be executive-level but the same job title in a second industry (e.g., a financial industry) may be associated with a lower seniority than executive-level.

Despite the challenge associated with determining "status," it is important that the status data be accurate. Accurate status data can be used by the systems and methods described herein for any one or more of the following functions: (i) search and/or discovery of entity profiles; (ii) derivation of insights into entities based on entity profiles; (iii) analysis and/or reporting of data from entity profiles; and/or (iv) visualization of the status of an entity or group of entities (e.g., over time) and/or other enhancements to the user interfaces of the systems described herein. For example, accurate status of entities can enable a user (e.g., a recruiter or employer) to search, sort, or filter entity profiles by status (e.g., seniority). This capability can enable users of the system to disregard over-qualified, under-qualified, or irrelevant entity profiles for a given position. In another example, accurate status data can be used to determine those entity profiles that have a high rate of promotion (e.g., an entity rising quickly through positions relative to his or her peers). In yet another example, accurate status data can be used to derive additional data about entities based on their entity profiles, for example, whether an entity is likely to change from a first position to a second position (e.g., based on the durations of the entity's tenures in previously-held positions, the trajectory of the entity's career, etc.). Examples of systems and methods related to determining whether an entity is likely to change positions can be found in U.S. patent application Ser. No. 13/910,029, titled "Systems and Methods for Notification of Profile Activity Suggestive of Career Change Across Multiple Websites" and filed on Jun. 4, 2013, which is hereby incorporated by reference herein in its entirety. In another example, accurate status data can be used to collect information on trends or other higher-level information from groups of entity profiles (e.g., as related to gender, position, sector, industry, company, location, etc. of the entities).

Visualizations of status data in a user interface of the system can be crucial for users of the system such as recruiters or employers to quickly and easily understand the status of an entity and the trajectory of the entity's status over time, and to be able to make decisions based on their understanding. To enable quick and easily interpretation of status information of an entity, visualization of the status data can include a specific indicator (e.g., a label or symbol) of entity status, an emphasis or highlight of a portion of an entity profile, and/or an indicator illustrating the entity profile relative to other profiles based on status.

In general, another innovative aspect of the subject matter described in this specification can be embodied in a computer-implemented method for training a status classifier. The method may include: selecting entity profiles for use in training the status classifier to classify status scores associated with a particular state, wherein each selected entity profile corresponds to a respective entity and includes the particular state; determining, for each of the selected entity profiles, a status score of the corresponding entity, the status score representing a status of the corresponding entity when the entity inhabited the particular state; and segmenting the determined status scores into two or more ranges based on a distribution of the determined status scores, each of the ranges corresponding to a status level.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the segmenting includes plotting the status scores in a box-and-whisker plot. In some embodiments, the segmenting includes: determining a lower quantile value, an upper quantile value, an inter-quantile range, and a threshold value based on a distribution of the status scores.

In some embodiments, the lower quantile value is greater than approximately M/N of the status scores in the distribution of status scores and less than all other status scores in the distribution, M being a number of status scores in the distribution and N being a number of quantiles. In some embodiments, the upper quantile value is less than approximately M/N of the status scores in the distribution of status scores and greater than all other status scores in the distribution, M being a number of status scores in the distribution and N being a number of quantiles. In some embodiments, the inter-quantile range is a range of values between the upper quantile value and the lower quantile value. In some embodiments, the threshold value is a minimum threshold value, and wherein the minimum threshold value is less than the lower quantile value. In some embodiments, the threshold value is a maximum threshold value, and wherein the maximum threshold value is greater than the upper quantile value.

In some embodiments, the segmenting includes segmenting the status scores into four ranges such that (i) a first status level corresponds to status scores greater than the maximum threshold value; (ii) a second status level corresponds to status scores between the maximum threshold value and the upper quantile range; (iii) a third status level corresponds to status scores within the inter-quantile range; and (iv) a fourth level status corresponds to status scores less than the lower quantile value. In some embodiments, the lower quantile value, upper quantile value, and inter-quantile range are, respectively, a lower quartile value, an upper quartile value, and an inter-quartile range.

In some embodiments, the status score representing the status of a particular entity when the particular entity inhabited the particular state is determined based on a value of a rank characteristic, a value of a preparation time characteristic, a value of a duration characteristic, and/or a value of a centrality characteristic. In some embodiments, determining the status score representing the status of the particular entity when the particular entity inhabited the particular state includes: determining, for the entity profile corresponding to the particular entity, a rank of the particular state in a temporal sequence of states inhabited by the particular entity, wherein the value of the rank characteristic is the determined rank of the particular state. In some embodiments, determining the status score representing the status of the particular entity when the particular entity inhabited the particular state includes: determining, for the entity profile corresponding to the particular entity, an amount of preparation time during which the particular entity inhabited one or more prior states before entering the particular state, wherein the value of the preparation time characteristic is the amount of preparation time during which the particular entity inhabited the prior states.

In some embodiments, determining the status score representing the status of the particular entity when the particular entity inhabited the particular state includes: determining, for the entity profile corresponding to the particular entity, a duration of time for which the particular entity inhabited the particular state, wherein the value of the duration characteristic is the duration of time for which the particular entity inhabited the particular state. In some embodiments, determining the status score representing the status of the particular entity when the particular entity inhabited the particular state includes: obtaining a graph with a plurality of nodes corresponding to a plurality of states and a plurality of directed edges corresponding to transitions between pairs of the states, wherein the value of the centrality characteristic is a centrality of the node corresponding to the particular state. In some embodiments, the status score of the particular entity when the particular entity inhabited the particular state is a product of (1) the value of the preparation time characteristic, (2) a logarithm of the value of the rank characteristic, and (3) a logarithm of the value of the duration characteristic. In some embodiments, the status score of the particular entity when the particular entity inhabited the particular state is a product of (1) the value of the preparation time characteristic, (2) a logarithm of the value of the centrality characteristic, and (3) a logarithm of the value of the duration characteristic.

In general, another innovative aspect of the subject matter described in this specification can be embodied in a computer-implemented status classification method including: obtaining a profile corresponding to a particular entity, wherein the profile indicates that the particular entity inhabited one or more states at one or more respective times; and for each of the states: obtaining a respective status classifier trained to classify status scores associated with the state, wherein the status classifier is trained by: selecting a plurality of entity profiles, wherein each selected entity profile corresponds to a respective entity and includes the state, determining, for each of the selected entity profiles, a status score of the corresponding entity, the status score representing a status of the corresponding entity when the corresponding entity inhabited the state, and segmenting the determined status scores into two or more ranges based on a distribution of the determined status scores, each of the ranges corresponding to a status level, and using the status classifier to determine a status level of the particular entity at the time the particular entity inhabited the state, including: determining a status score of the particular entity, the status score representing a status of the entity at the time the particular entity inhabited the particular state; and applying the status classifier to the status score of the particular entity to determine the status level of the particular entity at the time the particular entity inhabited the state.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the method further includes generating a visual representation of the particular entity's one or more status levels at the respective times; and presenting, in a user interface, the visual representation. In some embodiments, the visual representation is a line graph having one or more segments, each segment corresponding to a respective status level, of the one or more status levels, at the respective time. In some embodiments, the visual representation is a bar having one or more segments, each segment corresponding to a respective status level, of the one or more status levels, at the respective time. In some embodiments, the bar is a scroll bar adapted to scroll from a first end of the bar to a second end of the bar upon user interaction with the scroll bar, the first end having a segment representing a first status level at a first time and the second end having a segment representing a second status level at a second time, the second time being chronologically after the first time. In some embodiments, a segment of the one or more segments representing the status level at particular time closest to a present time is visually highlighted compared to other segments of the one or more segments, the visual highlighting including at least one of an increased size, a different shape, or a different color of the segment compared to the other segments.

In some embodiments, the systems described herein can automatically assess the status (e.g., seniority) of an entity relative to other entities. As discussed above, the assessment of status can be particularly challenging and has conventionally required manual determination by experts (e.g., recruiters with extensive experience). In some embodiments, the systems described herein can rely on specific rules that enable the automation of specific status assessment tasks that previously were not automated. These rules can further provide a stable and reproducible process for assessing status that a manual determination is unlikely to provide. For example, manual determinations of status by experts may differ based on, e.g., the length of their experiences or ill-defined perceptions of the entity being evaluated.

In some embodiments, the systems described herein can improve efficiency of mobile electronic devices (e.g., smart phones, smart watches, tablets, laptops, notebook computers, etc.). Specifically, by succinctly representing the assessed status of an entity on the entity's profile, the systems enable a user of the system to view summarized information about the entity's status. Therefore, user interfaces having summarized representation of entity status are improved over conventional user interfaces, which may require greater interaction or involvement by the user to glean an entity's status. Conventional user interfaces may even require greater (i.e., inefficient) amounts of the user interface (e.g., surface area in terms of pixels) to present similar information. Ultimately, this interface improvement has the effect of increasing efficiency of mobile devices by allowing users to quickly interpret the presented status assessment and utilize the user interfaces of mobile devices more effectively.

The details of one or more embodiments of the subject matter described in this specification are set forth in the accompanying drawings and the description below. Other features, aspects, and advantages of the subject matter will become apparent from the description, the drawings, and the claims.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

FIGS. 7A and 7B show images of another user interface for displaying entity status data, according to some embodiments.

DETAILED DESCRIPTION

Terms

Figure 1A:
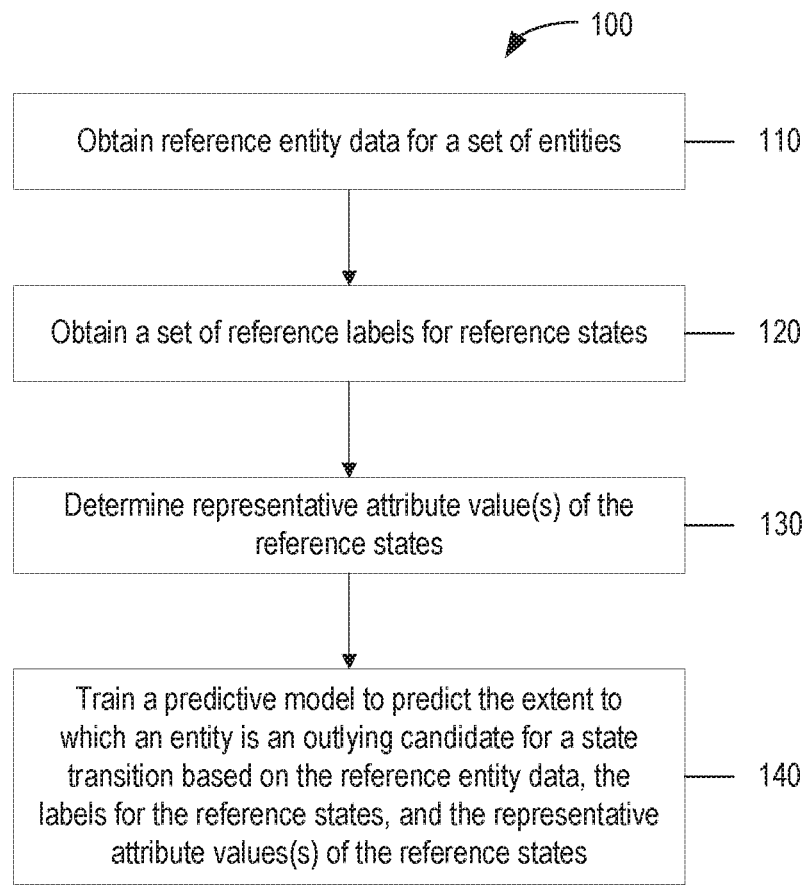
FIG. 1A is a flowchart of a method for generating a predictive model capable of predicting the extent to which entities are outlying candidates for state transitions, according to some embodiments.
Figure 1B:
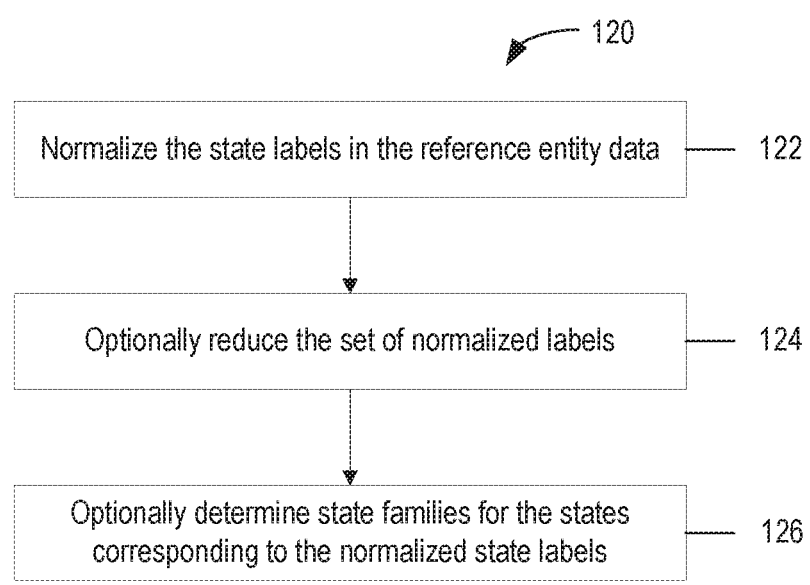
FIG. 1B is a flowchart of a method for generating a set of reference labels for states, according to some embodiments.
Figure 1C:
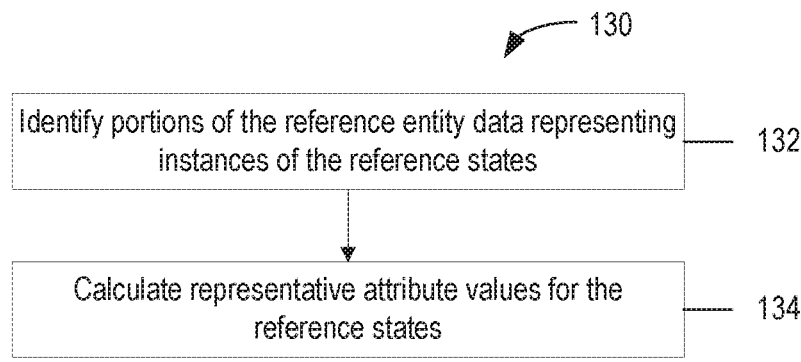
FIG. 1C is a flowchart of a method for determining representative attribute value(s) of reference states, according to some embodiments.
Figure 1D:
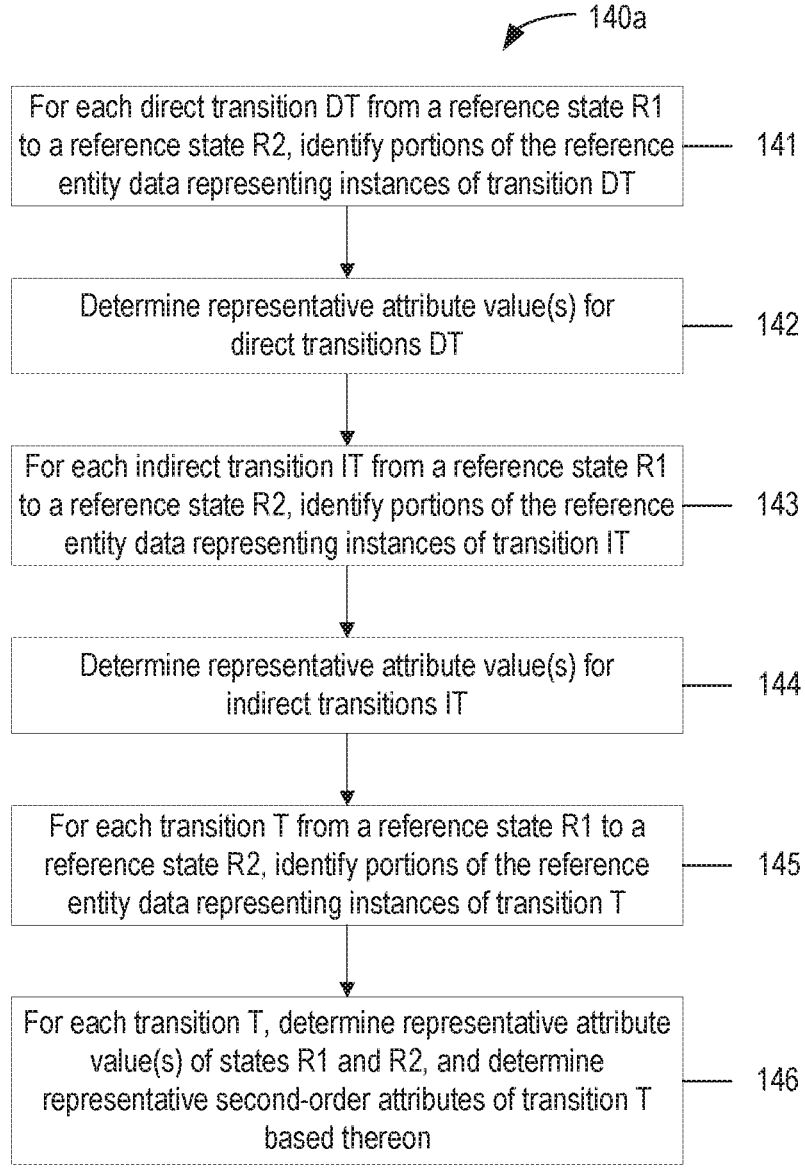
FIG. 1D is a flowchart of a method for determining representative attribute value(s) of transitions between reference states, according to some embodiments.

As used herein, "lower quartile value" ("LQV") refers to a value that is greater than one quarter of the values in a distribution and less than all other values in the distribution.

As used herein, upper quartile value ("UQV") refers to a value that is less than one quarter of the values in a distribution and greater than all other values in the distribution.

As used herein, interquartile range ("IQR") refers to UQV–LQV (e.g., UQV minus LQV or the range of values between (and optionally including) UQV and LQV).

As used herein, "Kth percentile value" refers to a value that is greater than K % of the values in the distribution and less than the remaining values in the distribution Generating a Predictive Model to Predict Outlying Candidates for State Transitions Referring to FIG. 1, a method 100 for generating a predictive model capable of predicting the extent to which entities are outlying candidates for state transitions may include steps of obtaining (110) reference entity data for a set of entities, obtaining (120) a set of reference ("canonical") labels for reference states, determining (130) representative attribute value(s) of the reference states, and training or tuning (140) a predictive model to predict the extent to which an entity is an outlying candidate for a state transition based on at least a portion of the reference entity data, the labels for the reference states, and the representative attribute value(s) of the reference states. Some embodiments of the steps of the method 100 are described in further detail below.

In step 110, reference entity data for a set of entities is obtained. The reference entity data may include an entity profile for each entity. The entity profile for an entity indicates at least a current state of the entity. An entity profile may also indicate one or more prior states of the entity and one or more prior state transitions of the entity. State transitions can be direct or indirect. A direct state transition refers to a transition directly from a pre-transition state PreTS to a post-transition state PostTS, without occupying an intermediate state. An indirect state transition refers to a transition indirectly from a pre-transition state PreTS to a post-transition state PostTS, with the entity occupying at least one intermediate state InterS between states PreTS and PostTS. As used herein, unless indicated otherwise, the term "transition" (without the modifier "direct" or "indirect") generally refers to both types of transition (direct and indirect).

For each state, the entity profile indicates a label for the state and optionally values of one or more attributes of the state, including but not limited to environmental attributes associated with the state and temporal attributes associated with the entity's time in the state (e.g., the rank of each state in the entity's temporal sequence of states, the amount of time the entity inhabited prior states before entering a given state ("preparation time"), the amount of time the entity occupied each state ("duration"), etc.). As just an example, for an application in which the states are jobs and the entities are candidates for the jobs (e.g., a recruiting application), a state label may correspond to a job title (or "position title"), and environmental attributes of a state (job) may include the employer, industry, company size, salary, location, etc.

In some embodiments, an entity profile includes a description (e.g., text description) of a state and/or of the entity's activity while in the state. As just one example, for a recruiting application, the entity profile may include data derived from a resume or social media content, and the description may include a job title, a summary of the candidate's duties and activities while holding that job title, and/or a summary of skills acquired or used while holding the job title.

State labels may be organized hierarchically into state families. An entity profile may indicate a state's family, or may include data from which the state's family can be derived. For example, a state's family may be derived from the description of the state and/or of the entity's activity while in the state. Some techniques for determining a state's family are described below.

For each state transition T, the entity profile indicates values of one or more attributes (e.g., temporal attributes) of the transition T. For example, the entity profile may indicate the rank of the transition T in the entity's temporal sequence of transitions, the amount of time the entity inhabited prior states before making the transition T (preparation time for transition T), the amount of time the entity occupied a pre-transition state PreTS before making the transition T to the post-transition state PostTS (duration in pre-transition state), the label of the post-transition state PostTS, etc.

In step 120, reference labels for reference states are obtained. In some embodiments, the reference labels are provided by a third party. The third-party data source may also specify state families for the reference labels. For example, for job titles, the O*NET OnLine taxonomy provided by the U.S. Department of Labor may be used. The O*NET taxonomy identifies job titles and job families corresponding to the job titles. In some cases, the same job title recurs in multiple different job families. For example, the job title "production manager" may recur in a wide variety of job families, including "management," "production," and/or "architecture and engineering."

In some embodiments, the reference labels are generated based on the reference entity data. Generating the reference labels may include sub-steps of normalizing (122) the state labels contained in the reference entity data, optionally reducing (124) the set of normalized labels to a smaller set, and/or optionally determining (126) state families for the states corresponding to the normalized state labels.

In the normalization sub-step 122, acronyms and abbreviations contained in the state labels of the reference entity data may be expanded (e.g., CEO→Chief Executive Officer, LPN→Licensed Practical Nurse, COO→Chief Operating Officer, Sr.→Senior, Sys→System, Eng→Engineer, Mgr-→Manager, etc.), and special characters (e.g., job codes, numbers, punctuation, etc.) may be removed. The normalized state labels may be used as the reference labels.

In the reduction sub-step 124, the set of normalized labels produced in sub-step 122 may be reduced to a smaller set. For example, the reduced set of labels may include only unique normalized labels found in X or more entity profiles (e.g., X=2, 3, or more). As another example, n-grams extracted from the most common labels within the set of normalized labels may be identified. Any suitable technique may be used to identify the most common labels, including but not limited to identifying the labels that occur most frequently in the entity profiles, the labels that occur in more than a threshold number of entity profiles, the labels that users search for most frequently using a search tool (e.g., search engine), etc. The n-grams found in the most common labels may be extracted and used as the reference labels. (As an illustrative example, "data scientist" and "clinical data scientist" are n-grams extracted from the label "principal clinical data scientist").

In sub-step 126, state families are determined for the reference states corresponding to the reference state labels. Portions of the reference entity data representing instances of each reference state may be identified. For example, instances in the reference entity data of (normalized) state labels that match the reference label corresponding to the reference state may be identified. Matching state labels can be found using exact match or fuzzy match techniques on the (normalized) state labels.

In addition, a vector representation (e.g., a weighted vector representation) of the description of each state may be generated. For each instance of a state label in the reference entity data that matches reference label, the description of the state and/or the entity's activities while in the state is extracted. A text corpus including all descriptions for the state is generated. For each instance of the state, a vector representation (e.g., a weighted vector representation) of the description is generated. Any suitable technique may be used to generate the vector representation, including but not limited to term-frequency/inverse-document-frequency (TF/IDF), Word2Vec, one-hot encoding, etc. (In the case of TF/IDF, the text corpus for the state is the TF/IDF corpus, and the description of an instance of a state is the TF/IDF document.) Optionally, dimensional reduction may be performed to limit the sizes of the vectors. Any suitable technique for dimension reduction may be used, including but not limited to principal component analysis (PCA). For each state, sets of the vector representations of instances of the state are formed, such that the vectors in each set are similar to each other and dissimilar from the vectors in the other sets. Any suitable technique for grouping the vector representations may be used, including but not limited to clustering (e.g., k-means clustering with k determined using any suitable technique, etc.), locality sensitive hashing (LSH), LSH Forest, etc. Each set of similar vectors represents a different state family for instances of the state.

Referring again to step 120, optionally, the reference labels may be restricted to include only labels associated with states that have specified attribute values (e.g., environmental attribute values). As an example, for a recruiting application, such state restrictions may be used to generate a set of reference position titles customized for a particular industry, country, company, company size, etc. Customization can be achieved by pre-processing or pre-filtering the reference entity data, prior to generating the reference labels, such that only state labels associated with states that have the specified attribute values are analyzed during the reference-label generation process. In addition or in the alternative, customization can be achieved by processing or filtering the reference labels, such that only reference labels associated with states that have the specified attribute values are retained.

As used herein, the state corresponding to a reference label may be referred to as a "reference state." A reference state may be uniquely defined by the corresponding reference label (and, optionally, the state family), or by the combination of the reference label and one or more attribute values of the state (and, optionally, the state family). Defining a state based on the reference label and one or more environmental attribute values facilitates differentiated analysis of states that have the same reference label but are associated with different environments.

In step 130, representative attribute value(s) of the reference states are determined. In a sub-step 132, portions of the reference entity data representing instances of the reference states are identified. To identify the portions of the reference entity data representing instances of a reference state, instances in the reference entity data of (normalized) state labels that match the reference label corresponding to the reference state are found. Matching state labels can be found using exact match or fuzzy match techniques on the (normalized) state labels. Some examples of suitable fuzzy matching techniques include, without limitation, techniques premised on the percentage of token overlap between the (normalized) state label and the reference label, and techniques premised on the Jacard distance between the (normalized) state label and the reference label. In addition or in the alternative, matching state labels can be found by using fuzzy match techniques (e.g., TF/IDF, Word2Vec, Doc2Vec) to match the state descriptions from the reference entity data to the description vectors corresponding to the reference states. For example, all instances of such matching state labels in the reference entity data can be found, without regard to other attributes of the reference state.

For each instance of a (normalized) state label in the reference entity data that matches reference label, the environmental and temporal attribute values associated with the state are extracted. If the reference state is defined in part by one or more attribute values of the state (e.g., the reference state is customized for a particular environmental attribute values), any portions of the reference entity data that match the state label but do not match the other attribute values of the state are filtered out.

In a sub-step 134, representative attribute values for the reference states are calculated. Examples of representative attributes for a state S may include, but are not limited to (1) average, median, and/or any other statistical measure of the "rank" of state S in entities' temporal sequences of states; (2) average, median, and/or any other statistical measure of the amount of time entities inhabited prior states before entering the state S ("preparation time"); (3) average, median, and/or any other statistical measure of the amount of time entities occupied the state S ("duration"); (4) in a graph with nodes corresponding to reference states and directed edges corresponding to transitions between the states, an indicator of the "centrality" (e.g., degree centrality) of the node representing state S; and/or (5) a state score calculated based on the extracted attribute values and/or other representative attribute values derived therefrom. For example, the state score may be equal to median preparation time*log (median rank)*log (average duration). As another example, the state score may be equal to median preparation time*log (centrality)*log (average duration). The state score may be determined using any suitable function. The inputs to the function may include but are not limited to distributions or statistical measures of rank, distributions or statistical measures of preparation time, distributions or statistical measures of duration, and/or distributions or statistical measures of centrality. Optionally, the state score can be adjusted (e.g., to account for state family, centrality, and/or other attributes of the state). The adjustment may be implemented by multiplying the raw state score by a factor F, wherein the factor F depends on the state's family, centrality, etc.

For ease of understanding, an example is provided. In this example, a reference state RS1 has a reference label RL, and is defined in part by a particular value V1 for an environmental attribute EA. A reference state RS2 has the same reference label RL, and is defined in part by a different value V2 for the environmental attribute EA. The reference entity data include multiple instances of states with (normalized) labels matching the reference label RL. A set S1 of those instances have value V1 for environmental attribute EA, another set S2 of the instances have value V2 for environmental attribute EA, and the remaining instances have neither value V1 nor value V2 for environmental attribute EA. The instances in set S1 are instances of the reference state S1. The instances in set S2 are instances of the reference state S2. Representative attributes for reference state RS1 may be calculated based on the attributes of the state instances in set S1, and representative attributes for reference state RS2 may be calculated based on the attributes of the state instances in set S2. For example, the title "Vice President" in the finance industry may have a representative average years of experience of 5 years, whereas the title "Vice President" in the banking industry may have a representative average years of experience of 25 years.

In step 140, a predictive model is trained or tuned to predict the extent to which an entity is an outlying candidate for a state transition based on at least a portion of the reference entity data, the labels for the reference states, and the representative attribute value(s) of the reference states. Examples of training or tuning three different types of predictive models are described below.

For a first type of predictive model (a "type-1 predictive model" or "type-1 PM"), tuning the predictive model involves determining criteria for identifying outlying instances of each reference state RS. Portions of the reference entity data representing instances of the reference state RS are used to determine a distribution of values for a specified attribute of the instances of the reference state. The specified attribute may be, for example, a temporal attribute (e.g., the rank of the state RS in an entity's temporal sequence of states, the amount of time an entity inhabited prior states before entering the state RS ("preparation time"), the amount of time an entity occupied the state RS ("duration"), etc.) or a derived attribute (e.g., an attribute having a value derived from values of other attributes). For example, the derived attribute may be a status score determined based on one or more temporal attributes of the entity's state (e.g., rank, preparation time, and/or duration associated with the state in the entity's sequence of states). For example, the status score may be equal to preparation time*log (rank)*log (duration). In some embodiments, the status score may depend on an attribute of the reference state corresponding to the entity's state (e.g., the centrality of the corresponding reference state). For example, the status score may be equal to preparation time*log (centrality)*log (duration).

Figure 2:
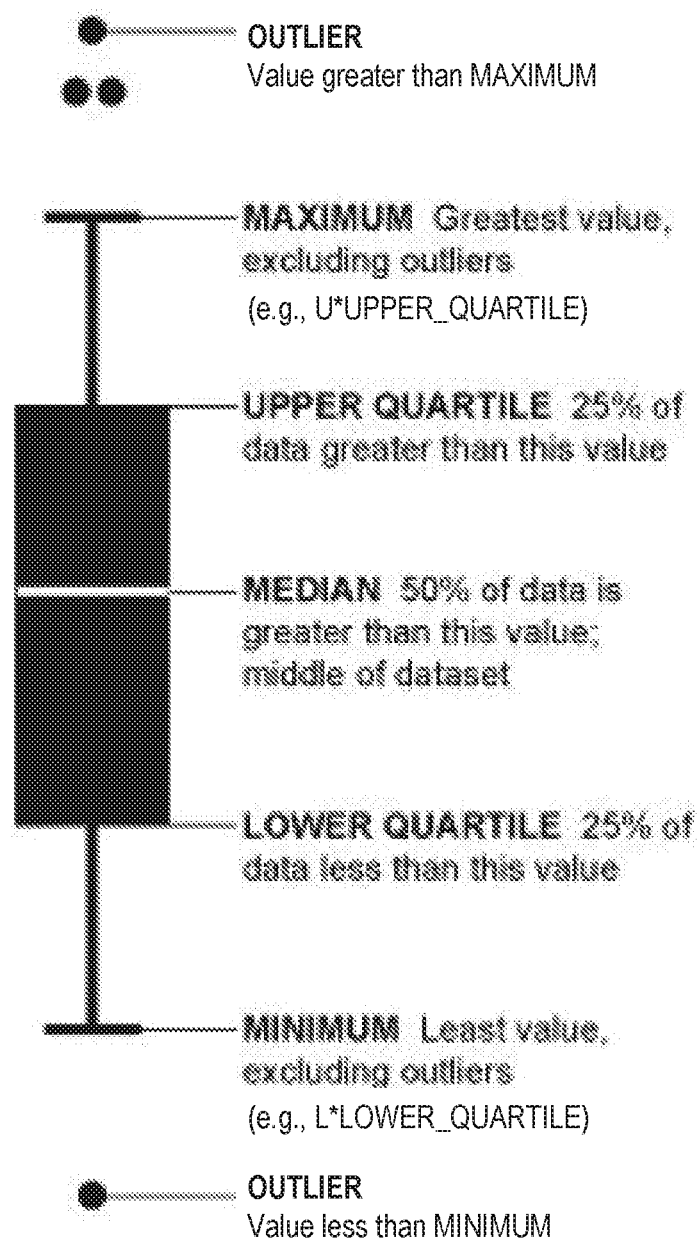
FIG. 2 shows a box-and-whisker plot that illustrates aspects of a method for training a predictive model to predict whether an entity is an outlying candidate for a transition to a post-transition state, according to some embodiments.

Based on the distribution of values for the specified attribute of the reference state, thresholds corresponding to outlying values for the specified attribute are determined. The box-and-whisker plot of FIG. 2 illustrates some aspects of the discussion below.

A minimum threshold value MinTV may be determined. Values less than MinTV may correspond to outlying instances of the reference state (e.g., entities that are under-qualified for the reference state). Some non-limiting examples of suitable values for MinTV may include (1) the LQV of the distribution; (2) L1*LQV, wherein the multiplicative factor L1 can be any suitable number less than 1 (e.g., 0.9, 0.8, 0.6, 0.5, 0.4, 0.2, 0.1, etc.); (3) LQV−L2*IQR, wherein the multiplicative factor L2 can be any suitable number (e.g., 1.2, 1.3, 1.4, 1.5, 1.6, 1.7, 1.8, etc.); (4) a value one, two, or more standard deviations below the mean or median of the values in the distribution; (5) the Kth percentile value of the distribution, where K is any suitable value (e.g., 1, 2, 5, 8, 10, 15, 20, 25, etc.); or (6) the mean or median of the distribution−L3, where L3 is any suitable number. L1, L2, and/or L3 may be user-specified or determined based on the values in the lower quartile of values.

A maximum threshold value MaxTV may be determined. Values greater than MaxTV may correspond to outlying instances of the reference state (e.g., entities that are over-qualified for the reference state). Some non-limiting examples of suitable values for MaxTV may include (1) the UQV of the distribution; (2) U1*UQV, wherein the multiplicative factor U1 can be any suitable number greater than 1 (e.g., 1.2, 1.4, 1.5, 2.0, etc.); (3) UQV+U2*IQR, wherein the multiplicative factor U2 can be any suitable number (e.g., 1.2, 1.3, 1.4, 1.5, 1.6, 1.7, 1.8, etc.); (4) a value one, two, or more standard deviations above the mean or median of the values in the distribution; (5) the Kth percentile value of the distribution, where K is any suitable value (e.g., 75, 80, 95, 90, 91, 95, 98, 99, etc.); or (6) the mean or median of the distribution+U3, where U3 is any suitable number. U1, U2, and/or U3 may be user-specified or determined based on the values in the upper quartile of values.

For a second type of predictive model (a "type-2 predictive model" or "type-2 PM"), tuning the predictive model involves determining 140a representative attribute value(s) of transitions between reference states. Representative attribute values of transitions between states may include representative first-order attribute value(s) of direct transitions between the states, representative first-order attribute value(s) of indirect transitions between the states, and/or representative second-order attribute value(s) of direct and/or indirect transitions between the states. The categories of representative attribute values of transitions are described in further detail below.

Representative first-order attribute value(s) of direct transitions between reference states may be determined as follows. In a sub-step 141, for a given direct transition DT from a pre-transition reference state PreTRS to a post-transition reference state PostTRS, portions of the reference entity data representing instances of the transition DT are identified. To identify the portions of the reference entity data representing instances of a direct transition, instances in the reference entity data of (normalized) state labels that match the reference label corresponding to the pre-transition reference state PreTRS are identified. Some examples of techniques for finding state labels that match a reference label are described above. For each matching state label, a determination is made as to whether the reference data indicate a direct transition from the state matching the pre-transition reference state PreTRS to a post-transition state. If so, a determination is made as whether the (normalized) state label of the direct post-transition state matches the reference label corresponding to the post-transition reference state PostTRS. Some examples of techniques for determining whether a state label matches a reference label are described above.

In a sub-step 142, representative attribute values for the transition DT are calculated. For each instance of the transition DT in the reference entity data, the attribute values associated with the transition DT are extracted. The extracted attribute values may be used to determine representative first-order attributes of the transition DT. Examples of representative first-order attributes of a transition DT from a pre-transition reference state PreTRS to a post-transition reference state PostTRS may include but are not limited to (1) the number of occurrences of the transition DT in the reference entity data ("direct transition count"); (2) the average, median, and/or any other statistical measure of the rank of transition DT in temporal sequence of transitions for entities that experience the transition DT; (3) the average, median, and/or any other statistical measure of the amount of time entities inhabited prior states before making the transition DT ("direct transition preparation time"); (4) the average, median, and/or any other statistical measure of the amount of time entities occupied the pre-transition reference state PreTRS prior to making the transition DT to the post-transition reference state PostTRS ("duration in pre-transition state"); (5) in a graph with nodes corresponding to reference states and directed edges corresponding to direct transitions, an indicator of the centrality (e.g., degree centrality) of the node representing state PreTRS; and/or (6) a transition score calculated based on the extracted attribute values and/or other representative attribute values derived therefrom.

For example, the transition score may be equal to median direct transition preparation time*log (median rank)*log (average duration in pre-transition state), or equal to median direct transition preparation time*log (centrality of PreTRS) *log (average duration). The transition score may be determined using any suitable function. The inputs to the function may include but are not limited to distributions or statistical measures of direct transition rank, distributions or statistical measures of direct transition preparation time, distributions or statistical measures of duration in pre-transition state, and/or distributions or statistical measures of the centrality of the pre-transition state PreTRS. Optionally, the transition score can be adjusted (e.g., to account for the state family of the post-transition state, the centrality of the pre-transition state, and/or other attributes of the transition). The adjustment may be implemented by multiplying the raw transition score by a factor F, wherein the factor F depends on the family of PostTRS, the centrality of PreTRS, etc.

Representative first-order attribute value(s) of indirect transitions between reference states may be determined as follows. In a sub-step 143, for a given indirect transition IT from a pre-transition reference state PreTRS to a post-transition reference state PostTRS, portions of the reference entity data representing instances of the transition IT are identified. To identify the portions of the reference entity data representing instances of an indirect transition, instances in the reference entity data of (normalized) state labels that match the reference label corresponding to the pre-transition reference state PreTRS are identified. Some examples of techniques for finding state labels that match a reference label are described above. For each matching state label, a determination is made as to whether the reference data indicate an indirect transition from the state matching the pre-transition reference state PreTRS to a post-transition state. If so, a determination is made as to whether the (normalized) state label of the indirect post-transition state matches the reference label corresponding to the post-transition reference state PostTRS. Some examples of techniques for determining whether a state label matches a reference label are described above.

In a sub-step 144, representative attribute values for the indirect transition IT are calculated. For each instance of the transition IT in the reference entity data, the attribute values associated with the transition IT are extracted. The extracted attribute values may be used to determine representative first-order attributes of the indirect transition IT. Examples of representative first-order attributes of a transition IT from a pre-transition reference state PreTRS to a post-transition reference state PostTRS may include but are not limited to (1) the number of occurrences of the transition IT in the reference entity data ("indirect transition count"); (2) the average, median, and/or any other statistical measure of the rank of transition IT in temporal sequences of transitions for entities that experience the transition IT; (3) the average, median, and/or any other statistical measure of the amount of time entities inhabited prior states before making the transition IT ("indirect transition preparation time"); (4) the average, median, and/or any other statistical measure of the amount of time entities occupied the pre-transition reference state PreTRS prior to making the transition IT to the post-transition reference state PostTRS ("duration in pre-transition state"); (5) the average, median, and/or any other statistical measure of the amount of time for entities to complete the indirect transition IT to the post-transition reference state PostTRS ("duration of indirect transition"); and/or (6) a transition score calculated based on the extracted attribute values and/or other representative attribute values derived therefrom.

For example, the transition score may be equal to median indirect transition preparation time*log (median rank)*log (average duration in pre-transition state), or equal to median indirect transition preparation time*log (centrality of PreTRS)*log (average duration). The transition score may be determined using any suitable function. The inputs to the function may include but are not limited to distributions or statistical measures of transition rank, distributions or statistical measures of transition preparation time, distributions or statistical measures of duration in pre-transition state, distributions or statistical measures of duration of indirect transition, and/or distributions or statistical measures of the centrality of the pre-transition state PreTRS. Optionally, the transition score can be adjusted (e.g., to account for the state family of the post-transition state, the centrality of the pre-transition state, and/or other attributes of the transition). The adjustment may be implemented by multiplying the raw transition score by a factor F, wherein the factor F depends on the family of PostTRS, the centrality of PreTRS, etc.

Representative second-order attribute value(s) of transitions T (e.g., direct and/or indirect transitions T) between reference states may be determined as follows. In a sub-step 145, for a given transition T from a pre-transition reference state PreTRS to a post-transition reference state PostTRS, portions of the reference entity data representing instances of the transition T are identified. Some examples of techniques for identifying portions of reference entity data representing instances of a transition T are described above.

In a sub-step 146, representative attribute value(s) of the pre- and post-transition reference states are calculated. Some examples of techniques for determining representative attribute value(s) of the reference states are described above. The representative attribute value(s) of the pre- and post-transition states may be used to determine representative second-order attributes of the transition T. Examples of representative second-order attributes of a transition T from a pre-transition reference state PreTRS to a post-transition reference state PostTRS may include but are not limited to (1) a difference (e.g., numerical difference, percentage difference, etc.) between a statistical measure of the rank of PostTRS and a statistical measure of rank of PreTRS; (2) a difference between a statistical measure of preparation time for PreTRS and a statistical measure of preparation time for PostTRS; (3) a difference between a statistical measure of duration for PreTRS and a statistical measure of duration for PostTRS; and/or (4) a difference between a score for PostTRS and a score for PreTRS.

There is a conceptual difference between first-order attributes of a transition and second-order attributes of a transition. Values of first-order attributes of a transition are derived from data associated with entities that actually experienced the transition (either directly or indirectly). Values of second-order attributes of a transition are derived from values of attributes of the pre- and post-transition states, without regard to the provenance of the data used to determine the values of the attributes of the states. For example, values of the pre-transition state PreTS and post-transition state PostTS may be derived from entity profiles of entities that occupied state PreTS and/or state PostTS, but never experienced a direct or indirect transition from state PreTS to state PostTS.

Tuning the type-2 predictive model further involves using the first-order and/or second-order representative attribute value(s) of the transitions T to determine criteria for identifying outlying instances of the transitions T. If the transition T is a direct transition, the specified attribute may be, for example, any of the above-described first-order representative attribute values of the direct transition T, any of the above-described second-order representative attribute values of the transition T, or any suitable combination thereof. If the transition T is an indirect transition, the specified attribute may be, for example, any of the above-described first-order representative attribute values of the indirect transition T, any of the above-described second-order representative attribute values of the transition T, or any suitable combination thereof.

Based on the distribution of values, thresholds corresponding to outlying values for the specified attribute of the transition are determined. A minimum threshold value MinTV may be determined. Values less than MinTV may correspond to outlying instances of the transition (e.g., entities that are under-qualified for the transition). Some non-limiting examples of suitable values for MinTV may include (1) the LQV of the distribution; (2) L1*LQV, wherein the multiplicative factor L1 can be any suitable number less than 1 (e.g., 0.9, 0.8, 0.6, 0.5, 0.4, 0.2, 0.1, etc.); (3) LQV−L2*IQR, wherein the multiplicative factor L2 can be any suitable number (e.g., 1.2, 1.3, 1.4, 1.5, 1.6, 1.7, 1.8, etc.); (3) a value one, two, or more standard deviations below the mean or median of the distribution; (4) the Kth percentile value of the distribution, wherein K is any suitable value (e.g., 1, 2, 5, 8, 10, 15, 20, 25, etc.); (5) the mean or median of the distribution−L3, wherein L3 is any suitable number. L1, L2, and/or L3 may be user-specified or determined based on the values in the lower quartile of values.

A maximum threshold value MaxTV may be determined. Values greater than MaxTV may correspond to outlying instances of the transition (e.g., entities that are over-qualified for the transition). Some non-limiting examples of suitable values for MaxTV may include (1) the UQV of the distribution; (2) U1*UQV, wherein the multiplicative factor U1 can be any suitable number greater than 1 (e.g., 1.2, 1.4, 1.5, 2.0, etc.); (3) UQV+U2*IQR, wherein the multiplicative factor U2 can be any suitable number (e.g., 1.2, 1.3, 1.4, 1.5, 1.6, 1.7, 1.8, etc.); (4) a value one, two, or more standard deviations above the mean or median of the distribution; (5) the Kth percentile value of the distribution, wherein K is any suitable value (e.g., 75, 80, 95, 90, 91, 95, 98, 99, etc.); (6) the mean or median of the distribution+U3, where U3 is any suitable number. U1, U2, and/or U3 may be user-specified or determined based on the values in the upper quartile of values.

For the type-1 predictive model, the representative attribute value(s) of the reference states and the criteria for identifying outlying instances of the reference states may be stored in any suitable data structure. Suitable data structures may include any data structures that can be searched efficiently (e.g., to obtain the representative attribute value(s) associated with a specified reference state). For example, suitable data structures may include a table or list indexed by unique identifiers corresponding to the reference states.

For the type-2 predictive model, the representative attribute value(s) of the reference states, the representative attribute value(s) of the transitions, and the criteria for identifying outlying instances of the reference states and the transitions may be stored in any suitable data structure. Suitable data structures may include any data structures that can be searched efficiently (e.g., to obtain the representative attribute value(s) associated with a specified reference state or a specified transition). For example, suitable data structures may include a table or list indexed by unique identifiers corresponding to the reference states. Optionally, the data structure may also support efficient traversal of reference states and transitions. For example, suitable data structures may include a graph with nodes corresponding to reference states and directed edges corresponding to direct transitions.

A third type of predictive model (a "type-3 predictive model" or "type-3 PM") may be trained to predict the extent to which an entity is qualified to transition to a specified post-transition state PostTS. The prediction may be qualitative (e.g., the prediction may specify that the entity is under-qualified, appropriately qualified, or over-qualified for the specified transition) or quantitative (e.g., the prediction may specify a number or code that indicates the extent to which the entity is qualified for the transition). Some techniques for training a type-3 predictive model are described below.

The type-3 predictive model may make the prediction based on any suitable input data, including but not limited to data associated with the post-transition state PostTS, data associated with the entity, and/or data associated with a transition to the post-transition state PostTS. For example, suitable input data may include but are not limited to (1) data indicating values of representative attribute(s) of the post-transition state PostTS, (2) data indicating values of representative attribute(s) of a state associated with the entity (e.g., the entity's current state), (3) data indicating values of representative attribute(s) of a transition from the state associated with the entity to the post-transition state PostTS, (4) entity profile data for the entity, and/or (5) data derived from the entity's entity profile data.

As just one example, the input data used by a type-3 predictive model to predict the extent to which an entity is qualified to transition to a post-transition state PostTS may include (1) a status score for the entity (some techniques for determining an entity's status score are described below), (2) the state score of the post-transition state (which may be obtained, for example, using the techniques described above), (3) a difference between the state score and the entity's status score (e.g., numerical difference, percentage difference, etc.), (4) the duration for which the entity has occupied its state (e.g., current state) (e.g., in months), (5) the sum of (a) the entity's preparation time for its state and (b) the duration for which the entity has occupied its state (e.g., in months), (6) one or more values of environmental attributes of the entity's state (e.g., for recruiting applications, (a) the size of the company by which the candidate is currently employed, and (b) the distance (e.g., in miles) between a the candidate's location (for example, the location of the candidate's residence or the location of the candidate's current employer) and a specified location (for example, a fixed location or the location of the post-transition position)), (7) a feature vector derived from a description of the entity's state (which may be obtained, for example, using the techniques described above) (8) a family or category of states that includes the entity's state, (9) a family or category of states that includes the post-transition state, (10) a minimum preparation time associated with state PostTS, (11) a maximum preparation time associated with state PostTS, (12) Jacard similarity between the label of state PostTS and the label of the entity's current state, and/or (13) Jacard similarity or percentage overlap between skills associated with state PostTS and skills of the entity. In some embodiments, the sign of the difference between the state's score and the entity's status score may indicate whether the transition constitutes a progression (e.g., promotion) from the entity's current state (e.g., positive sign) or a regression (e.g., demotion) from the entity's current state (e.g., negative sign). An entity's status score may represent the entity's status (e.g., among a specified of entities).

A neural network may be used to derive the feature vector. In some embodiments, vector representations of state descriptions (or portions thereof) contained in the reference entity data are generated. As just one example, the vector representation of each state description may be generated based on the state label (e.g., job title), one or more environmental attribute values (e.g., company name and industry), and the state summary (e.g., summary of a person's duties and activities while holding the job title) contained in the state description. Any suitable technique for generating the vector representations may be used, including but not limited to Global Vectors for Word Representation (GloVe), Word2Vec, etc. For purposes of generating the vector representations of the state descriptions, the corpus of text against which the vectors are generated may include all the state description text upon which all the vector representations are based. The vector representations of the state descriptions may then be provided as inputs to a neural network, which may output a feature vector indicative of whether the entity (e.g., person) is under-qualified, appropriately-qualified, or over-qualified for a specified position. Optionally, dimensional reduction may be performed to limit the sizes of the vectors. Any suitable technique for dimension reduction may be used, including but not limited to principal component analysis (PCA).

Using the feature vector to train the predictive model to predict whether a person is under-qualified, appropriately-qualified, or over-qualified for employment in a specified position may be particularly beneficial in scenarios in which the pool of candidates to which the predictive model is applied includes few or no candidates who are unqualified for the position.

Any suitable type of predictive model may be used. In some embodiments, the predictive model includes one or more classifiers. The classifier can include one or more decision trees (e.g., a random forest of decision trees), artificial neural networks, support vector machines, and/or Bayesian networks, for example. Other classifiers are possible. In some embodiments, the predictive model is trained using statistical regression techniques (e.g., logistic regression, linear regression, etc.).

A model training module (or "model trainer") may be used to train the predictive model. In some embodiments, the model trainer uses labeled input data to train the predictive model. The labeled input data may include multiple data sets, each of which may include, for example, (1) input data as described above (e.g., data associated with a post-transition state PostTS, data associated with an entity, data associated with a transition to the post-transition state PostTS, and/or any other suitable input data), and (2) label data indicating whether the entity is under-qualified, appropriately-qualified, or over-qualified for a transition to the post-transition state PostTS.

The model trainer may use any suitable techniques to train the predictive model to predict the extent to which an entity is qualified to transition to a specified post-transition state PostTS. In some embodiments, the model trainer trains the predictive model by fitting the predictive model to the labeled input data. In some embodiments, the model trainer uses the label data as the targets (or "responses") for the predictive model, and uses the remaining input data as the features (or "predictors") for the predictive model.

In some embodiments, the model trainer trains the predictive model using labeled input data associated with a wide variety states, transitions, and entities. A predictive model trained in this way may be capable of accurately predicting the extent to which a wide variety of entities having a diverse set of current and/or prior states are qualified to transition to a specified post-transition state PostTS.

In some embodiments, the model trainer customizes the predictive model for particular types of states (e.g., states that have specified values for specified attributes), particular types of transitions (e.g., transitions to such types of states), and/or particular types of entities (e.g., entities that have specified values for specified attributes). As just one example, for an application in which the predictive model is used to predict whether a person is under-qualified, appropriately-qualified, or over-qualified for employment in a specified position, the model trainer may customize the predictive model for a particular industry, country, company, company size, etc.

Some examples have been described in which a predictive model is trained to predict whether an entity is under-qualified, appropriately-qualified, or over-qualified for a transition to a specified state. In addition or in the alternative, the predictive model may be trained to predict the stage of a transition evaluation process to which the entity will progress. As just one example, for an application in which the states are jobs and the entities are candidates for jobs, the stages of the transition evaluation process may include evaluation by a third-party recruiter, evaluation by the company offering the job, communication from the company to the candidate, an interview of the candidate by the company, a job offer extended by the company to the candidate, etc.

Alternatively or additionally, a predictive model may be trained (e.g., using machine learning techniques, deep learning techniques, etc.) to recognize outlying instances of states. For example, the predictive model may be trained using a portion of the reference entity data wherein instances of states have been labeled as outlying, under-qualified, over-qualified, etc. The inputs to the predictive model could be information in the entity profiles, and the output of the predictive model could be a prediction as to whether an entity having a particular entity profile is an outlier (e.g., over-qualified, under-qualified, etc.) for a particular state (e.g., a state specified by the trainer, the entity's current state, etc.).

Using a Predictive Model to Predict Outlying Candidates for State Transitions

Above, some techniques for training or tuning predictive models have been described. The following paragraphs describe some techniques for using such predictive models to predict whether an entity is an outlying candidate. In some embodiments, a predictive model may be used to predict whether an entity is an outlying candidate for a transition from a specified pre-transition state PreTS (e.g., the entity's current state) to a specified post-transition state PostTS.

In the preceding section, multiple types of predictive models are described, including a type-1 PM, a type-2 PM, and a type-3 PM. The type-1 predictive model may include a table or list indexed by unique identifiers corresponding to reference states. For each reference state, the type-1 PM may store one or more representative attribute value(s) of the reference state and criteria for identifying outlying instances of the reference state. The type-2 predictive model may include a graph with nodes corresponding to reference states and directed edges corresponding to direct transitions from respective pre-transition reference states to respective post-transition reference states. For each reference state/node, the type-2 PM may store one or more representative attribute value(s) of the reference state and criteria for identifying outlying instances of the reference state. For each direct transition/edge, the type-2 PM may store one or more representative attribute value(s) of the transition and criteria for identifying outlying instances of the transition. The type-3 predictive model may be trained to predict the extent to which an entity is qualified to transition to a specified post-transition state based on data associated with the post-transition state and data associated with the entity, and (optionally) data associated with a transition to the post-transition state.

Figure 3:
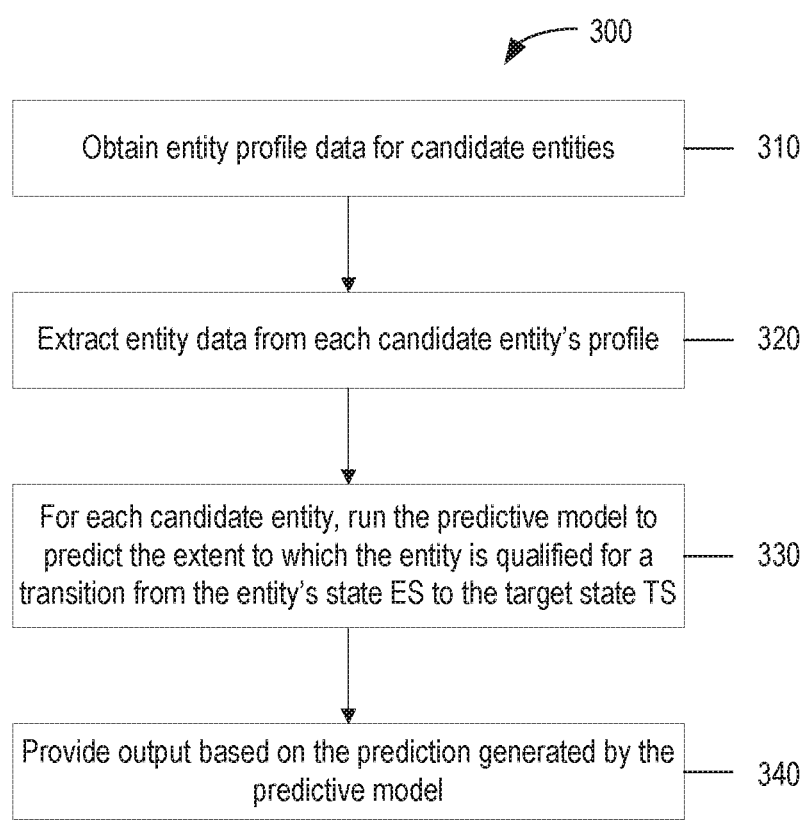
FIG. 3 is a flowchart of a method for detecting outlying candidates for a transition to a specified post-transition state, according to some embodiments.

Referring to FIG. 3, a method 300 for detecting outlying candidates for a transition to a specified post-transition state PostTS using a type-1 PM, a type-2 PM, or a type-3 PM may include steps 310-340.

In step 310, entity profile data for candidate entities are obtained. The entity profile data may be obtained using any suitable technique. In some embodiments, the entity profile data are based on a social media profile (e.g., a social media profile containing employment-related information) and/or a resume of an entity (e.g., a candidate for a job).

In step 320, for each candidate entity, entity data is extracted from the candidate entity's profile. The extracted entity data may include data indicative of one or more states of the entity (e.g., a current state of the entity). Data indicative of a state of an entity may include a label for the state, values of one or more environmental attributes associated with the state, values of one or more temporal attributes associated with the state (e.g., rank, preparation time, duration), a description of the state and/or the entity's activity while in the state, etc.

In some embodiments, additional data may be derived from the extracted entity data. For example, a reference state corresponding to the entity's state may be identified. Some techniques for identifying a reference state matching a state indicated by a state label (and, optionally, environmental attribute values associated with the state) are described above. As another example, a job family corresponding to the reference state may be identified. Some techniques for identifying a job family corresponding to a reference state based on a description of the state and/or of the entity's activity while in the state are described above.

In some embodiments, an entity's status score may be determined. The status score may be determined based on, for example, one or more temporal attributes of the entity's state (e.g., rank, preparation time, duration). In some embodiments, the status score may also depend on an attribute of the reference state corresponding to the entity's state (e.g., the centrality of the corresponding reference state). For example, the entity's status score may be a function of rank, preparation time, and/or duration (e.g., status score=preparation time*log(rank)*log(duration)) or a function of centrality, preparation time, and/or duration (e.g., status score=preparation time*log(centrality)*log(duration)). Optionally, the entity's status score can be adjusted (e.g., to account for state family, centrality, and/or other attributes of the reference state corresponding to the entity's state). The adjustment may be implemented by multiplying the raw entity status score by a factor F, wherein the factor F depends on the reference state's family, centrality, etc.

In step 330, for each candidate entity, data identifying the post-transition state PostTS and data indicative of the state of the entity are provided as inputs to the predictive model, which predicts the extent to which the entity is under-qualified, appropriately-qualified, or over-qualified for a transition to the post-transition state. For example, the data provided to a type-1 PM may include data identifying the post-transition state PostTS and the candidate entity's status score. The type-1 PM may look up the entry for the post-transition state PostTS in the PM's data structure (e.g., table), and extract the criteria for identifying outlying instances of the post-transition state from that entry (e.g., a minimum threshold value MinTV such that an entity status score less than MinTV indicates that the entity is under-qualified for the post-transition state, and/or a maximum threshold value MaxTV such that an entity status score greater than MaxTV indicates that the entity is over-qualified for the post-transition state). The type-1 PM may apply the criteria to the entity status score (e.g., by comparing the entity status score to the minimum and maximum threshold values) and determine, based on the application of the criteria, whether the entity is under-qualified (e.g., entity status score<MinTV), appropriately-qualified (e.g., MinT-$V\leq$entity status score$\leq$MaxTV), or over-qualified (e.g., MaxTV<entity status score) for the post-transition state.

As another example, the data provided to a type-2 PM may include data identifying the post-transition state PostTS, data identifying the reference state corresponding to the entity's state, and the candidate entity's status score. The type-2 PM may look up the entry for a transition from the entity's (reference) state to the post-transition state PostTS in the PM's data structure (e.g., graph), and extract the criteria for identifying outlying instances of the transition from that entry (e.g., a minimum threshold value MinTV such that an entity status score less than MinTV indicates that the entity is under-qualified for the transition from the entity's state to the post-transition state, and/or a maximum threshold value MaxTV such that an entity status score greater than MaxTV indicates that the entity is over-qualified for a transition from the entity's state to the post-transition state). The type-2 PM may apply the criteria to the entity status score (e.g., by comparing the entity status score to the minimum and maximum threshold values) and determine, based on the application of the criteria, whether the entity is under-qualified (e.g., entity status score<MinTV), appropriately-qualified (e.g., MinT$V\leq$entity status score$\leq$MaxTV), or over-qualified (e.g., MaxTV<entity status score) for a transition from the entity's state to the post-transition state.

As yet another example, the data provided to a type-3 PM may include (1) the entity's status score, (2) the state score of the post-transition state (which may be obtained, for example, using the techniques described above), (3) a difference between the state score and the entity's status score (e.g., numerical difference, percentage difference, etc.), (4) the duration for which the entity has occupied its state (e.g., current state), (5) the sum of (a) the entity's preparation time for its state and (b) the duration for which the entity has occupied its state, (6) one or more values of environmental attributes of the entity's state (e.g., for an application in which the predictive model is used to predict the extent to which a person is qualified for employment in a specified position: the size of the company by which the person is currently employed, and the distance between the person's location and a specified location), and/or (7) a feature vector derived from a description of the entity's state (which may be obtained, for example, using the techniques described above). The type-3 PM may predict, based on the input data, the extent to which the entity is qualified for the post-transition state (or qualified for a transition from the entity's state to the post-transition state).

In step 340, output may be provided based on the prediction generated by the predictive model. For example, the entity profiles (or portions thereof) of the candidates may be displayed, with outlying candidates labeled as outliers/under-qualified/over-qualified. As another example, the entities may be ranked as candidates for the transition based, at least in part, on the predicted extent to which the candidate is under-qualified or over-qualified for the position. As yet another example, outlying entities may be removed from a pool (e.g., list) of candidates.

Figure 4:
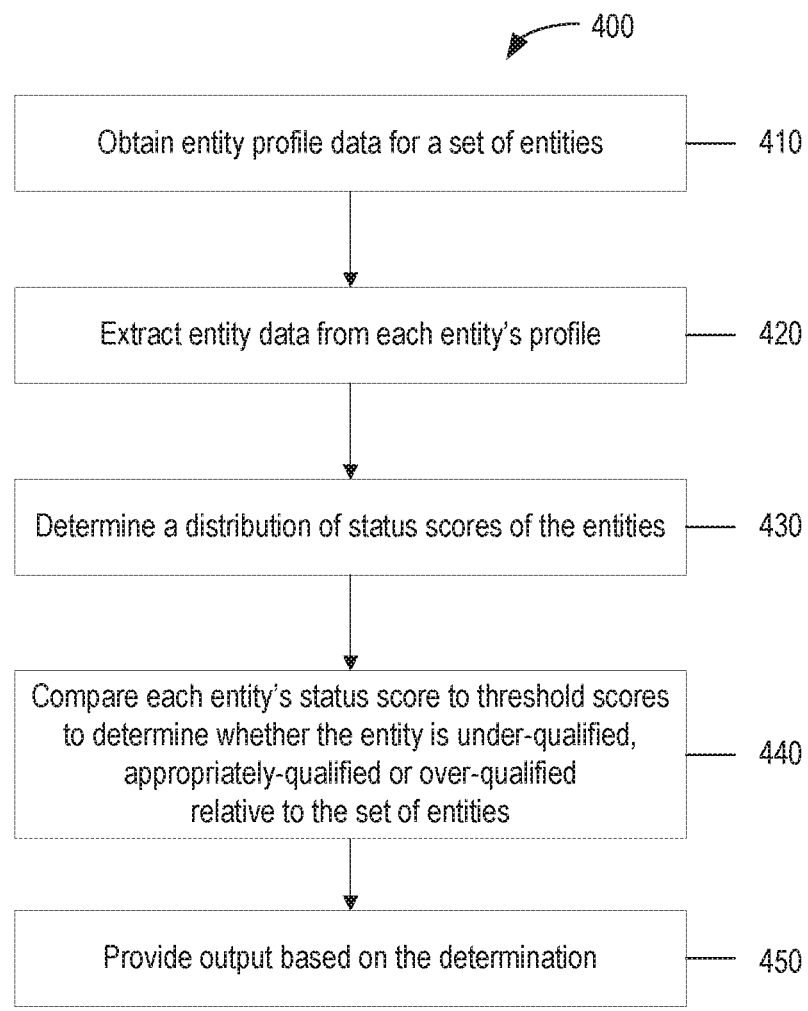
FIG. 4 is a flowchart of a method for detecting outlying entities relative to a set of entities, according to some embodiments.

In addition or in the alternative, techniques similar to those used to build a type-1 PM may be used to predict whether one or more entities in a set of entities are outlying candidates for a state transition as compared to the other candidates in the set. Referring to FIG. 4, a method 400 for detecting outlying candidates within (and relative to) a set of candidates may include steps 410-450.

In step 410, entity profile data for each entity are obtained. Some examples of techniques for obtaining entity profile data are described above.

In step 420, entity data are extracted from each entity's profile. Some examples of extracted entity data are described above. Additional data may be derived from the extracted entity data. Some examples of derived data are described above. Entity status scores may be determined for each entity. Some techniques for determining entity status scores are described above.

In step 430, a distribution of the entity status scores is determined. Based on the distribution of status scores, thresholds corresponding to outlying status scores are determined. For example, a minimum threshold score MinTS and a maximum threshold score MaxTS may be determined. Status scores less than MinTS may correspond to entities that are under-qualified, relative to the set of entities being evaluated. Status scores greater than MaxTS may correspond to entities that are over-qualified, relative to the set of entities being evaluated.

Examples of suitable values for MinTS may include, without limitation, (1) the lower quartile value (LQV) of the distribution of entity status scores, (2) L1*LQV (examples of suitable values for a multiplicative factor L1 and suitable techniques for determining L1 are described above), (3) LQV−L2*IQR (examples of suitable values for a multiplicative factor L2 and suitable techniques for determining L2 are described above), (4) a value one, two, or more standard deviations below the mean or median of the status scores in the distribution of status scores, (5) the Kth percentile value of the distribution of status scores, where K is any suitable value (e.g., 1, 2, 5, 8, 10, 15, 20, 25, etc.), or (6) the mean or median of the distribution of status scores minus L3, where L3 is any suitable number.

Examples of suitable values for MaxTS may include, without limitation, (1) the upper quartile value (UQV) of the distribution of entity status scores, (2) U1*UQV (examples of suitable values for a multiplicative factor U1 and suitable techniques for determining U1 are described above), (3) UQV+U2*IQR (examples of suitable values for a multiplicative factor U2 and suitable techniques for determining U2 are described above), (4) a value one, two, or more standard deviations above the mean or median of the status scores in the distribution of status scores, (5) the Kth percentile value of the distribution of status scores, where K is any suitable value (e.g., 75, 80, 95, 90, 91, 95, 98, 99, etc.), or (6) the mean or median of the distribution of status scores plus U3, where U3 is any suitable number.

In step 440, each entity's status score may be compared to the minimum and maximum threshold scores to determine whether the entity is under-qualified (e.g., entity status score<MinTS), appropriately-qualified (e.g., MinTS≤entity status score≤MaxTS), or over-qualified (e.g., MaxTS<entity status score) relative to the set of entities.

In step 450, output may be provided based on the generated determination. For example, the entity profiles (or portions thereof) of the candidates may be displayed, with outlying candidates (relative to the pool of candidates) labeled as outliers/under-qualified/over-qualified. As another example, outlying entities may be removed from a pool (e.g., list) of candidates.

Determining the Status Level of an Entity

In some embodiments, the exemplary systems described herein can associate a status score of an entity, as described above, with a status level. For example, status scores (e.g., seniority scores) can be stratified or classified into two or more status levels (e.g., seniority levels). This classification can be beneficial for a number of reasons. For instance, classifying status scores into two or more status levels can summarize the status scores at a high level, thereby enabling an end user to more easily understand the entity's status. Likewise, the two more status levels (e.g., junior, senior, etc.) may be more easily visualized than numerous status scores, as discussed further below. Additionally, processing of fewer numbers of status levels may be more efficient as compared to the processing of the more numerous status scores.

Figure 5A:
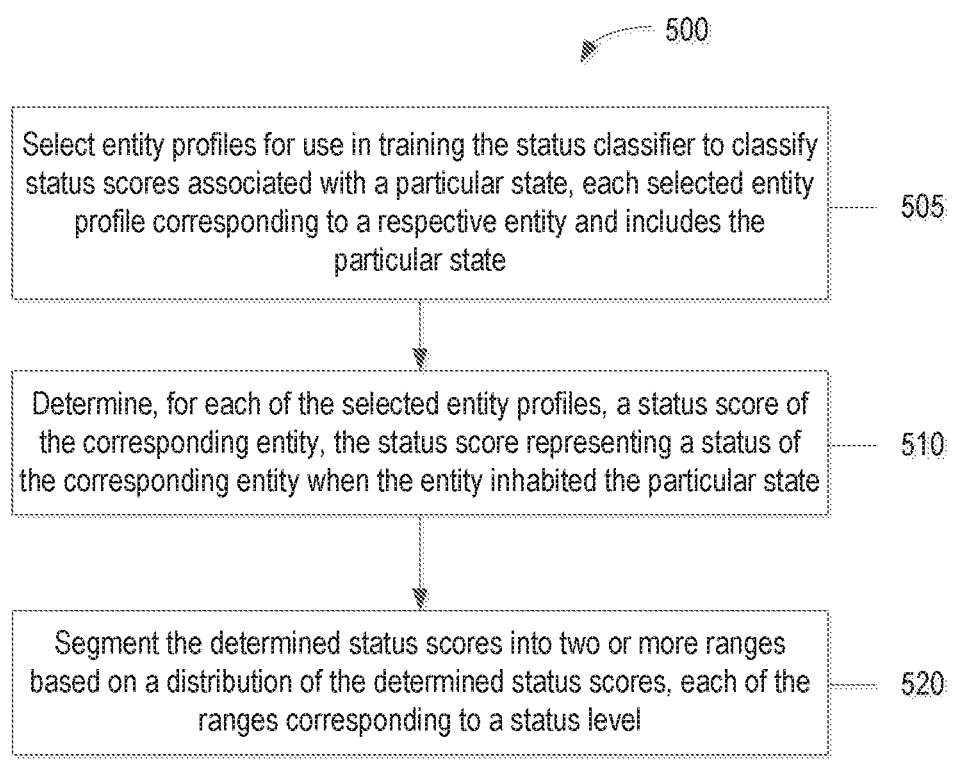
FIG. 5A is a flowchart of a method for building a status classifier, according to some embodiments.

Referring to FIG. 5A, a method 500 for building a status classifier may include steps 505-520. After the status classifier is built, it may be used to classify (e.g., determine) the status of an entity based on the entity's status score. In some embodiments, the status classifier may be specific to entities associated with (e.g., currently or previously in) a particular state (e.g., position). In such embodiments, the method 500 may be used to build multiple status classifiers, each specific to a corresponding state. Subsequently, the status classifier matching a state associated with an entity may be selected from the collection of status classifiers, and the selected classifier may be used to classify (e.g., determine) the entity's status based on the entity's status score.

In step 505, a set S of entity profiles are selected for use in training the classifier. In some embodiments, each of the selected entity profiles identifies a particular state, indicating that the entity corresponding to the profile is associated with the particular state (e.g., the entity is currently in the particular state or was previously in the particular state). The classifier built using the selected set S of entity profiles may be tailored for determining the status level of entities associated with the particular state. Thus, in a recruitment application, profiles of entities that currently hold or previously held a particular position may be selected.

In step 510, status scores corresponding to the selected entity profiles are determined using any of the status scoring techniques described above. For example, the entity profile data may be used to determine the status scores of the corresponding entities (e.g., the entities' current status scores and/or their status scores while they were in the particular state. Thus, in the recruitment application, the status score determined for each of the selected entity profiles may represent the current status of the corresponding entity or the entity's status when the entity was in the particular position.

In step 520, the determined status scores are segmented into status levels. In some embodiments, the segmentation of the scores is performed based on an analysis of the status scores (e.g., a statistical analysis of the distribution of the status scores). For example, the status scores may be analyzed to determine which ranges of scores correspond to various quantiles (e.g., tertiles, quartiles, quintiles, deciles, etc.) of the set of status scores. The ranges of scores that correspond to various quantiles may be determined based on one or more attributes (e.g., spread) of the scores' distribution. For example, an exemplary method for automatically segmenting status scores into four status levels based on quantile analysis can include sub-steps 522 and 524.

In step 522, the system can determine LQV, UQV, IQR, MinTV, and MaxTV for the status scores of the set S of entities using any suitable techniques, including but not limited to the techniques described above. In step 524, the system can classify the status scores into four status levels according to the following functions or relations:

Level 1 status=status score>MaxTV

Level 2 status=status score between UQV and MaxTV

Level 3 status=status score within the IQR

Level 4 status=status score<LQV

In recruiting applications, status levels 1, 2, 3, and 4 may represent, respectively, "executive" status, "senior" status, "mid-level" status, and "junior" (or "entry-level") status.

For instance, status scores in the "Computer and Mathematical" job family may have a high distribution from the lowest to highest status score. The below table provides exemplary ranges of status scores and corresponding status levels for the "Computer and Mathematical" job family.

TABLE 1

Exemplary status scores and corresponding status levels for the "Computer and Mathematical" job family. The "Associated Seniority" column denotes the associated seniority of the Status Level column.

| Status Score | Status Level | Associated Seniority |
|---|---|---|
| 0 – 11 | Level 1 | Junior or Entry-Level |
| 11 – 27 | Level 2 | Mid-level |
| 27 – 50 | Level 3 | Senior |
| 50+ | Level 4 | Executive |

For comparison, status scores in the "Food Preparation and Service" job family may have low distribution from lowest to highest status score. The below table provides exemplary ranges of status scores and corresponding status levels for the "Food Preparation and Service" job family.

TABLE 2

Exemplary status scores and corresponding status levels for the "Food Preparation and Service" job family. The "Associated Seniority" column denotes the associated seniority of the Status Level column.

| Status Score | Status Level | Associated Seniority |
|---|---|---|
| 0 – 7 | Level 1 | Junior or Entry-Level |
| 7 – 15 | Level 2 | Mid-level |
| 15+ | Level 3 | Senior |

Note the differences between the classifiers for the two job families. The greater spread of status scores in the "Computer and Mathematical" job family yields four status levels corresponding to relatively large ranges of status scores, whereas the lower spread of status scores in the "Food Preparation and Service" job family yields three status levels corresponding to relatively small ranges of status scores. The number of status levels per state family (e.g., job family) and/or the mapping of status scores to status levels may be determined by analyzing the distribution of status scores to determine an appropriate number of status levels.

In general, the number of status levels for a state family may increase as the spread of the family's distribution of status scores increases. In some embodiments, the determination of the number of status levels can be based on a number of job titles in a given job family. For example, if the job family includes four job titles (or four groups of job titles) indicating a progression from entry-level position (e.g., "Business Analyst") to mid-level position (e.g., "Program Manager") to a senior level position (e.g., "Director of Business Intelligence") to an executive-level position (e.g., "Senior Vice President of Business Operations), the four job titles (or groups of job titles) can determine the number of quantiles (e.g., quartiles) corresponding to status levels.

An example has been described in which the segmentation of the scores is performed automatically based on a statistical analysis of the distribution of the status scores. Other techniques for segmenting the status scores may be used. In some embodiments, the status scores are graphically represented in a box-and-whisker plot in which the status scores are segmented into quantiles. Within the box-and-whisker plot, appropriate ranges for each quantile can be determined. In some embodiments, the appropriate ranges can be determined by the spread of the scores in the box-and-whisker plot for a given state family (e.g., job family). In some embodiments, the ranges can be determined manually by a user of the system.

Figure 5B:
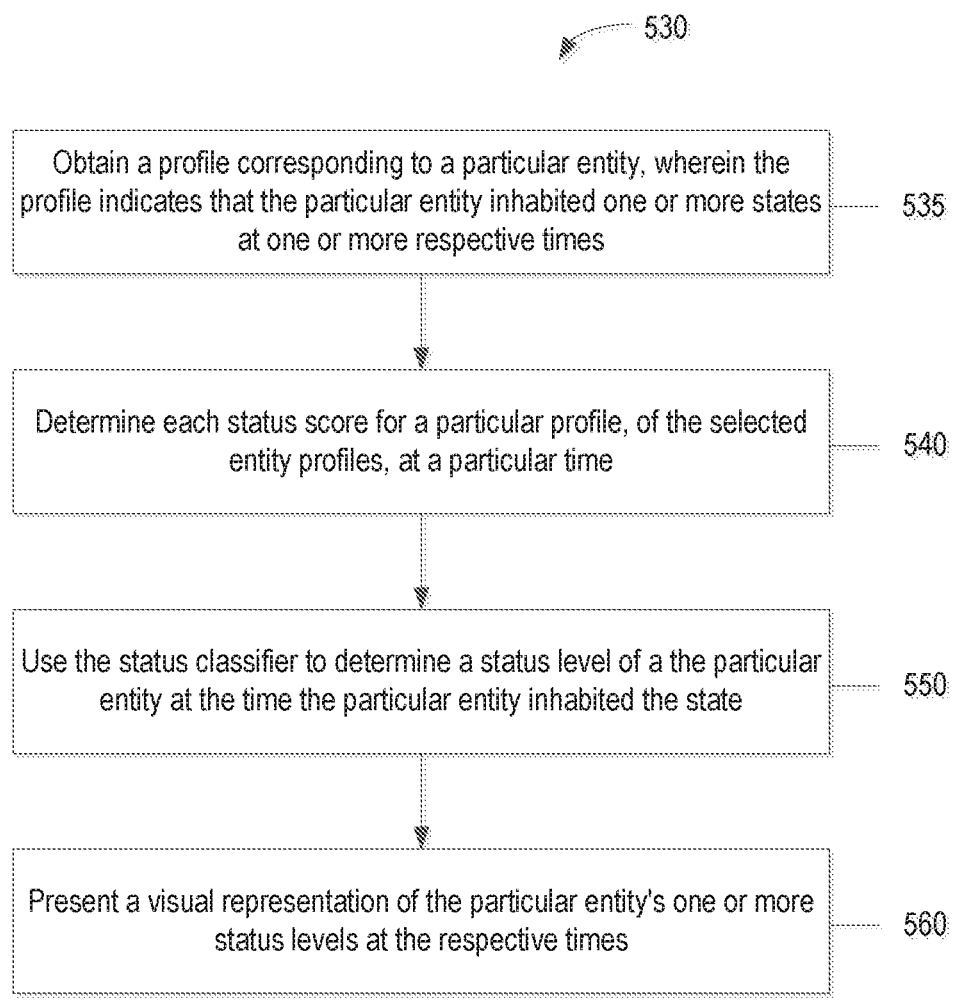
FIG. 5B is a flowchart of a method for determining and/or visualizing the status of an entity at a particular time or period, according to some embodiments.

Referring to FIG. 5B, a method 530 for determining a particular entity's status level at a particular time (e.g., in the present or at a past date) may include steps 535-560. In step 535, a particular entity's profile indicating that the particular entity inhabited one or more states at one or more respective times is obtained.

In step 540, the exemplary system can determine an entity's status score at a given time utilizing the methods described herein. For example, the system may determine an entity's current status score, the entity's status score at a previous time while the entity was in its current state, the entity's status score at a previous time while the entity was in a prior state, or the entity's status score on a particular date.

In step 550, the classifier used to determine the entity's status level is selected based on the entity state that corresponds to the time for which the status score was calculated. In other words, the classifier that matches a state of the entity is selected. In the example illustrated by Table 1, an entity having a status score of 26 and a position in the "Computer and Mathematical" job family is assigned the status level "Level 2" associated with "Mid-Level" seniority. In the example illustrated by Table 2, an entity having a status score of 17 and a position in the "Food Preparation and Service" job family is assigned the status level "Level 3" associated with "Senior"-level seniority.

In some embodiments, steps 540-550 may be performed multiple times to determine an entity's status score at multiple times within a specified period of time (e.g., throughout the entity's state history or a portion thereof).

Figure 6A:
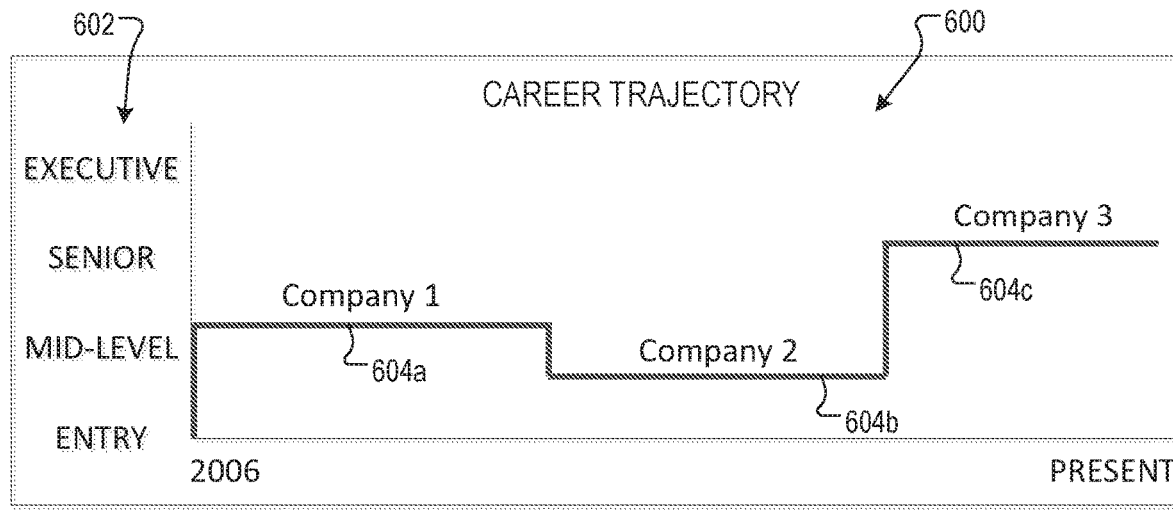
FIGS. 6A and 6B show images of a user interface for displaying entity status data, according to some embodiments.

In step 560, a visual representation of the entity's assigned status level can be presented via a user interface of the system (e.g., as part of a broader visualization of the entity's profile). The visual representation may include historical status levels. Referring to FIG. 6A, the visual representation can be a line graph 600 plotting status levels 602 (e.g., entry, mid-level, senior, executive) as a function of time 604 (e.g., from 2005 to present) on the X-axis. The segments 606a, 606b, 606c of the line graph 600 represent the duration of the assigned status level. The status levels 602 are mapped to areas or ranges on the Y-axis of the graph. The status levels 602 may be equally spaced on the Y-axis or spaced in another manner. In some embodiments, the segment(s) can be associated with one or more organization(s) (e.g., Company 1, Company 2, Company 3). For example, the entity associated with line graph 600 had a "Mid-Level" status level at Company 1 for a first duration (e.g., from 2006 to a date between 2006 and the present date), as illustrated by segment 606a.

Figure 6B:
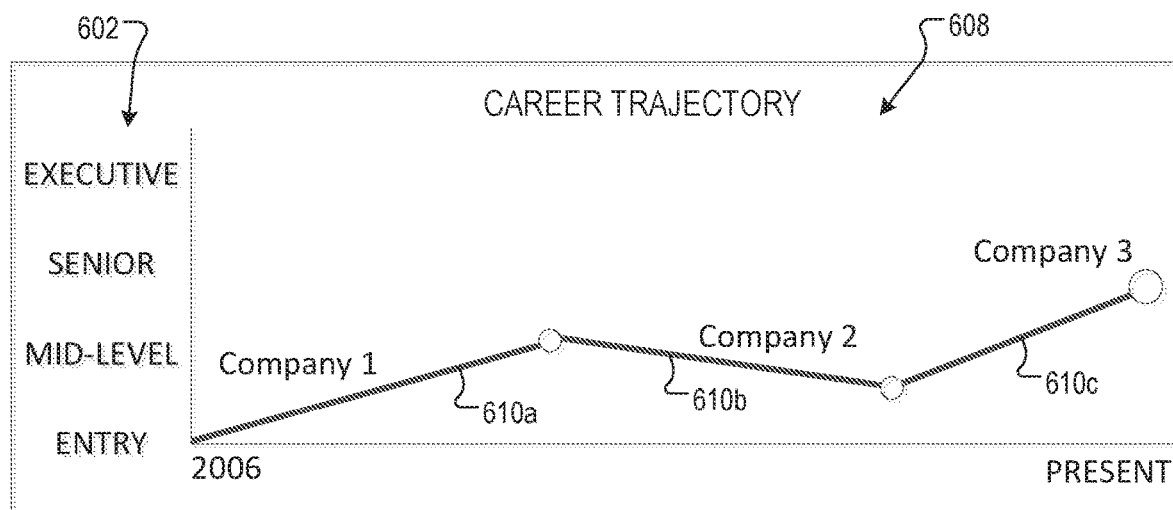

Referring to FIG. 6B, the visual representation can be a line graph 608 plotting status levels 602 as a function of time 604. The segments 610a, 610b, 610c of the line graph 608 represent the duration of the assigned status level. The status levels 602 are mapped to areas or ranges on the Y-axis of the graph. The status levels 602 may be equally spaced on the Y-axis or spaced in another manner. In some embodiments, the segment(s) can be associated with one or more organization(s). FIG. 6A shows the entity's status changing (or being updated) only when the state changes, whereas FIG. 6B shows the entity's status changing even while the entity remains in a given state. Thus, for example, the entity associated with line graph 608 had a "Entry"-level status level at Company 1 in 2006 and experienced increased seniority to "Mid-Level" status level at some time between 2006 and the present, as illustrated by segment 610a.

Referring to FIG. 7A, the visual representation can be a bar 700 (e.g., a horizontal bar or a vertical bar) having segments representing status levels as a function of time. In some embodiments, the bar is a horizontal scroll bar which is adapted to scroll between its left and right ends, for example, when a user of the user interface clicks on a respective end of the scroll bar. The segments each may represent a status level (e.g., entry, mid-level, senior, executive), as in exemplary segments 702a and 702b, or may represent a change from a first status level to a second status level, as in exemplary segment 702c (e.g., from "Mid-level" to "Senior"). In some embodiments, the shape and/or size of the bar 700 may change to visually indicate the recency of a status. The increase in size or shape can visually emphasize to a user of the user interface the present status level of the entity associated with the status level. For example, referring to FIG. 7B, segment 702d representing of the most recent status level (e.g., "Senior") is greater in size than the previous segment 702c. In some embodiments, each segment can visually denote the organization at which the entity had the status level. For example, segment 702b illustrates that the entity had "Mid-level" status level at organization "Company." In some embodiments, the width of the segments of the scroll bar may be dependent on the duration for which the entity had the status level.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 8:
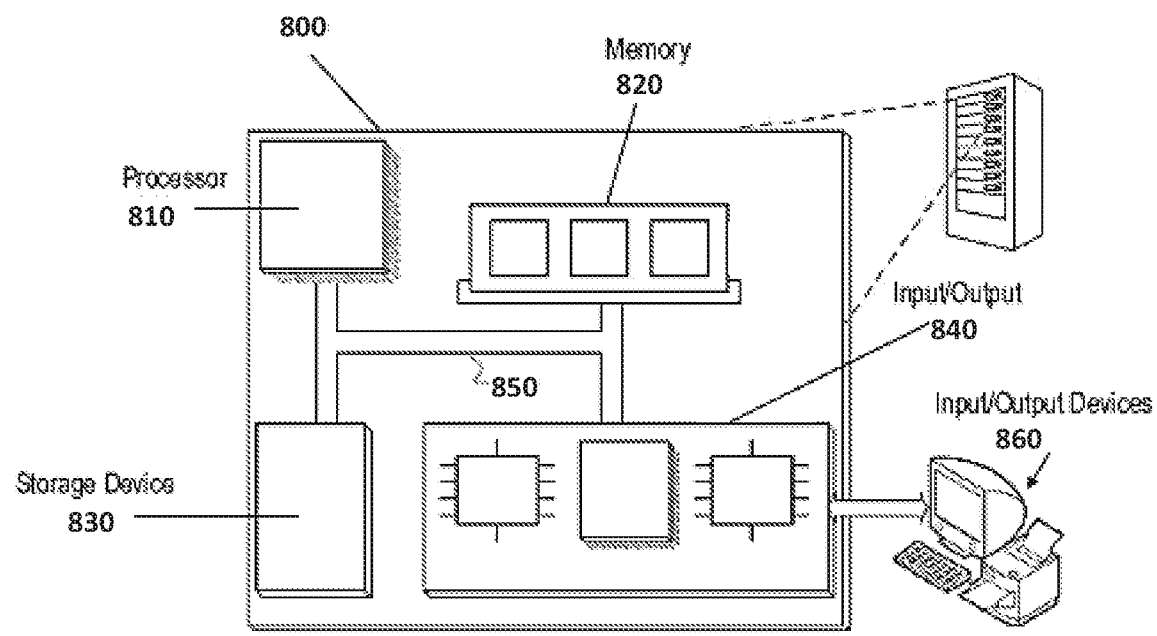
FIG. 8 shows a block diagram of a computer, according to some implementations.

FIG. 8 is a block diagram of an example computer system 800 that may be used in implementing the technology described in this document. General-purpose computers, network appliances, mobile devices, or other electronic systems may also include at least portions of the system 800. The system 800 includes a processor 810, a memory 820, a storage device 830, and an input/output device 840. Each of the components 810, 820, 830, and 840 may be interconnected, for example, using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830.

The memory 820 stores information within the system 800. In some implementations, the memory 820 is a non-transitory computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a non-transitory computer-readable medium. In various different implementations, the storage device 830 may include, for example, a hard disk device, an optical disk device, a solid-date drive, a flash drive, or some other large capacity storage device. For example, the storage device may store long-term data (e.g., database data, file system data, etc.). The input/output device 840 provides input/output operations for the system 800. In some implementations, the input/output device 840 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, such as a server farm or a set of widely distributed servers, or may be implemented in a single computing device.

Although an example processing system has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method comprising:
    obtaining profile data for a candidate entity;
    identifying, based on the profile data, a first state associated with the candidate entity;
    selecting a predictive model, comprising a neural network, trained to predict an extent to which an entity is qualified for a state transition from the first state to a second state, wherein the predictive model is trained by:
        obtaining reference entity data indicating the first state and optionally the second state for each entity included in a first plurality of entities, and indicating the second state and optionally the first state for each entity included in a second plurality of entities;
        determining values of one or more representative attributes of the first and second states based on the reference entity data, and providing at least a portion of the reference entity data and the representative attribute values of the first and second states to a training module for the predictive model;
    determining, based on the profile data, a status score of the candidate entity, the status score representing a status of the candidate entity when the entity inhabited the first state; and
    using the predictive model to predict an extent to which the candidate entity is qualified for the state transition from the first state to the second based, at least in part, on the status score of the candidate entity.

2. A computer-implemented method for training a status classifier, the method comprising:
　selecting entity profiles for use in training the status classifier to classify status scores associated with a particular state, wherein each selected entity profile corresponds to a respective entity and includes the particular state, wherein the training is completed by a predictive model comprising a neural network;
　determining, for each of the selected entity profiles, a status score of the corresponding entity, the status score representing a status of the corresponding entity when the entity inhabited the particular state; and
　segmenting the determined status scores into two or more ranges based on a distribution of the determined status scores, each of the ranges corresponding to a status level.

3. The method of claim 2, wherein the segmenting comprises:
　determining a lower quantile value, an upper quantile value, an inter-quantile range, and a threshold value based on a distribution of the status scores.

4. The method of claim 3, wherein the lower quantile value is greater than approximately M/N of the status scores in the distribution of status scores and less than all other status scores in the distribution, M being a number of status scores in the distribution and N being a number of quantiles.

5. The method of claim 3, wherein the upper quantile value is less than approximately M/N of the status scores in the distribution of status scores and greater than all other status scores in the distribution, M being a number of status scores in the distribution and N being a number of quantiles.

6. The method of claim 3, wherein the inter-quantile range is a range of values between the upper quantile value and the lower quantile value.

7. The method of claim 3, wherein the threshold value is a minimum threshold value, and wherein the minimum threshold value is less than the lower quantile value.

8. The method of claim 3, wherein the threshold value is a maximum threshold value, and wherein the maximum threshold value is greater than the upper quantile value.

9. The method of claim 3, wherein the segmenting comprises:
　segmenting the status scores into four ranges such that (i) a first status level corresponds to status scores greater than the maximum threshold value; (ii) a second status level corresponds to status scores between the maximum threshold value and the upper quantile range; (iii) a third status level corresponds to status scores within the inter-quantile range; and (iv) a fourth level status corresponds to status scores less than the lower quantile value.

10. The method of claim 9, wherein the lower quantile value, upper quantile value, and inter-quantile range are, respectively, a lower quartile value, an upper quartile value, and an inter-quartile range.

11. The method of claim 2, wherein the status score representing the status of a particular entity when the particular entity inhabited the particular state is determined based on a value of a rank characteristic, a value of a preparation time characteristic, a value of a duration characteristic, and/or a value of a centrality characteristic.

12. The method of claim 11, wherein determining the status score representing the status of the particular entity when the particular entity inhabited the particular state comprises:
　determining, for the entity profile corresponding to the particular entity, a rank of the particular state in a temporal sequence of states inhabited by the particular entity, wherein the value of the rank characteristic is the determined rank of the particular state.

13. The method of claim 11, wherein determining the status score representing the status of the particular entity when the particular entity inhabited the particular state comprises:
　determining, for the entity profile corresponding to the particular entity, an amount of preparation time during which the particular entity inhabited one or more prior states before entering the particular state, wherein the value of the preparation time characteristic is the amount of preparation time during which the particular entity inhabited the prior states.

14. The method of claim 11, wherein determining the status score representing the status of the particular entity when the particular entity inhabited the particular state comprises:
　determining, for the entity profile corresponding to the particular entity, a duration of time for which the particular entity inhabited the particular state, wherein the value of the duration characteristic is the duration of time for which the particular entity inhabited the particular state.

15. The method of claim 11, wherein determining the status score representing the status of the particular entity when the particular entity inhabited the particular state comprises:
　obtaining a graph with a plurality of nodes corresponding to a plurality of states and a plurality of directed edges corresponding to transitions between pairs of the states, wherein the value of the centrality characteristic is a centrality of the node corresponding to the particular state.

16. The method of claim 11, wherein the status score of the particular entity when the particular entity inhabited the particular state is a product of (1) the value of the preparation time characteristic, (2) a logarithm of the value of the rank characteristic, and (3) a logarithm of the value of the duration characteristic.

17. The method of claim 11, wherein the status score of the particular entity when the particular entity inhabited the particular state is a product of (1) the value of the preparation time characteristic, (2) a logarithm of the value of the centrality characteristic, and (3) a logarithm of the value of the duration characteristic.

18. A computer-implemented status classification method, comprising:
　obtaining a profile corresponding to a particular entity, wherein the profile indicates that the particular entity inhabited one or more states at one or more respective times; and
　for each of the states:
　obtaining a respective status classifier trained via a predictive model comprising neural network to classify status scores associated with the state, wherein the status classifier is trained by:
　　selecting a plurality of entity profiles, wherein each selected entity profile corresponds to a respective entity and includes the state, determining, for each of the selected entity profiles, a status score of the corresponding entity, the status score representing a status of the corresponding entity when the corresponding entity inhabited the state, and segmenting the determined status scores into two or more ranges based on a distribution of the determined status scores, each of the ranges corresponding to a status level, and using the status classifier to determine a status level of the particular entity at the time the particular entity inhabited the state, including:

determining a status score of the particular entity, the status score representing a status of the entity at the time the particular entity inhabited the particular state; and applying the status classifier to the status score of the particular entity to determine the status level of the particular entity at the time the particular entity inhabited the state.

19. The method of claim 18, further comprising:

generating a visual representation of the particular entity's one or more status levels at the respective times; and presenting, in a user interface, the visual presentation, wherein the visual representation is:

(i) a line graph having one or more segments, each segment corresponding to a respective status level, of the one or more status levels, at the respective time;

(ii) a bar having one or more segments, each segment corresponding to a respective status level, of the one or more status levels, at the respective time; or (iii) a scroll bar adapted to scroll from a first end of the bar to a second end of the bar upon user interaction with the scroll bar, the first end having a segment representing a first status level at a first time and the second end having a segment representing a second status level at a second time, the second time being chronologically after the first time.

20. The method of claim 19, wherein a segment of the one or more segments representing the status level at particular time closest to a present time is visually highlighted compared to other segments of the one or more segments, the visual highlighting including at least one of an increased size, a different shape, or a different color of the segment compared to the other segments.

* * * * *